United States Patent
Fenton et al.

(10) Patent No.: US 7,299,819 B1
(45) Date of Patent: Nov. 27, 2007

(54) WATER FLOW SENSOR ALONE AND IN COMBINATION WITH A METHOD AND APPARATUS FOR SELECTIVELY SHUTTING OFF THE FLOW OF WATER TO A BUILDING

(75) Inventors: John A. Fenton, 4201 SW. Jay Ave., Pendleton, OR (US) 97801; Donald E. Hulick, Pendleton, OR (US)

(73) Assignee: John A. Fenton, Pendleton, OR (US)

( * ) Notice: Subject to any disclaimer, the term of this patent is extended or adjusted under 35 U.S.C. 154(b) by 0 days.

(21) Appl. No.: 11/451,754

(22) Filed: Jun. 12, 2006

(51) Int. Cl.
*F16K 17/00* (2006.01)
*F16K 17/26* (2006.01)
*G01F 1/28* (2006.01)

(52) U.S. Cl. .................. 137/493; 137/460; 137/493; 73/861.74

(58) Field of Classification Search ............. 137/460; 73/861.74, 861.02
See application file for complete search history.

(56) References Cited

U.S. PATENT DOCUMENTS

| | | | |
|---|---|---|---|
| 2,359,338 A * | 10/1944 | Tyden | 340/610 |
| 3,559,197 A * | 1/1971 | Jarvis et al. | 340/610 |
| 3,621,865 A * | 11/1971 | Baggaley | 137/101.21 |
| 3,749,864 A * | 7/1973 | Tice | 200/81.9 M |
| 3,761,657 A * | 9/1973 | Miller | 200/81.9 R |
| 3,877,524 A | 4/1975 | Glenn, Jr. | |
| 4,197,809 A * | 4/1980 | Johnson | 116/275 |
| 4,614,122 A * | 9/1986 | Graves | 73/861.74 |
| 4,791,254 A * | 12/1988 | Polverari | 200/81.9 M |
| 4,797,666 A | 1/1989 | Baxter et al. | |
| 4,797,820 A * | 1/1989 | Wilson et al. | 700/284 |
| 4,807,661 A | 2/1989 | Lewis et al. | |
| 4,868,566 A | 9/1989 | Strobel et al. | |
| 4,880,030 A | 11/1989 | Terry | |
| 4,906,807 A * | 3/1990 | Siebert et al. | 200/81.9 M |
| 5,034,648 A * | 7/1991 | Gastgeb | 310/330 |
| 5,049,860 A * | 9/1991 | Farrell et al. | 340/610 |
| 5,183,983 A * | 2/1993 | Knop | 200/81.9 M |
| 5,189,911 A * | 3/1993 | Ray et al. | 73/292 |
| 5,971,011 A | 10/1999 | Price | |
| 6,032,540 A * | 3/2000 | Hawkins | 73/861.75 |
| 6,209,576 B1 | 4/2001 | Davis | |
| 6,338,279 B1 * | 1/2002 | Tsataros | 73/861.56 |
| 6,374,846 B1 | 4/2002 | DeSmet | |
| 6,510,748 B2 * | 1/2003 | Cooper | 73/861.74 |
| 6,516,826 B2 * | 2/2003 | Allen | 137/118.04 |
| 6,548,775 B1 * | 4/2003 | Edwards | 200/81.9 M |
| 6,708,722 B1 | 3/2004 | Goodenough | |
| 6,730,927 B1 * | 5/2004 | Smith et al. | 250/573 |
| 2003/0117289 A1 | 6/2003 | Uhler | |
| 2004/0031523 A1 | 2/2004 | Zeng | |
| 2006/0048821 A1 | 3/2006 | Fenton | |

* cited by examiner

Primary Examiner—Michael Cygan
Assistant Examiner—Jonathan Dunlap
(74) Attorney, Agent, or Firm—Klarquist Sparkman LLP

(57) ABSTRACT

Embodiments disclosed herein relate in part to water flow sensors, and also to such water flow sensors in combination with a system used to selectively shut off the flow of water through a water supply pipe to a building, such as in the event of a broken water pipe. Such systems included in the combination can also optionally discontinue electrical power to a water heater to minimize the risk of water heater elements burning out in the event a water heater is at the risk of being drained of water, such as due to a broken water pipe.

28 Claims, 10 Drawing Sheets

WATER FLOW SENSOR ALONE AND IN COMBINATION WITH A METHOD AND APPARATUS FOR SELECTIVELY SHUTTING OFF THE FLOW OF WATER TO A BUILDING

TECHNICAL FIELD

The technology disclosed herein relates in part to water flow sensors. In one form, such sensors are particularly useful for detecting forward and back flow of water in a building water supply line. The water flow sensors can be used in a system for selectively shutting off the flow of water through a water supply pipe to a building, such as in the event of a broken water pipe. Such a system also can optionally discontinuing electrical power to a water heater to minimize the risk of water heater elements burning out in the event a water heater is at risk of being drained of water, such as due to a broken water pipe determined in response to signals from the water flow sensor.

SUMMARY

In accordance with one aspect of an embodiment, a flow sensor comprises a housing through which water can flow. A flow detector is positioned within the housing and is movable in one direction in response to the flow of water in a forward direction when water is flowing from an inlet toward an outlet of the housing. The flow detector is movable in another direction when water is flowing in a backward direction from the outlet toward the inlet. In one specifically desirable form, the flow detector comprises a switch actuator in the form of a flap pivotally supported within the housing for movement in directions corresponding to a direction of water flow through the housing. A circuit closer coupled to the flap operates to close a first circuit in the event of the forward flow of water through the housing, and to close a second circuit in the event water is flowing in the backflow direction. Although plural components can comprise the circuit closer, (e.g., separate elements for closing the respective circuits), in an exemplary desirable form, the circuit closer comprises a cam mounted to an actuator flap for engaging respective first or second electrical contacts to close the respective first and second circuits depending upon the direction of water flow and thereby to the direction of movement of the actuator flap. In a specific example, the cam itself forms a part of the respective first and second electrical circuits. The first and second contactors can comprise elongated contacts, such as contact rods, that are cantileverly supported within the housing in a position to make contact with the cam as the actuator flap is moved.

In a specific example, each contact rod can have an exposed distal end portion positioned to engage the cam when the actuator flap is moved in the direction that results in engagement of the contact. The contact rod can be supported within a sleeve that surrounds all but the exposed distal end portion that projects outwardly from the end of the sleeve. The contact rod of the example is free to move within limits defined by the clearance between an interior wall of the sleeve and the exterior of the contact rod. As a result, the contact rod can flex while remaining in contact with the cam as the actuator and cam continue to pivot from partially to more fully opened positions.

A biasing mechanism, such as a coil spring, can be coupled to the actuator, such as to the cam, for returning the actuator to a no flow indicating position.

Electrical heating elements from hot water tanks are known to fail and require replacement as a result of such heating elements continuing to be energized following loss of water in the water tank. It would be desirable, in accordance with certain embodiments, to shut off the power to a water heater in the event of the occurrence of conditions that may have drained the water from the water heater. Additionally, for some individuals, such as the elderly, it can be difficult to shut off the water supply to a house or other building in the event of a broken water pipe. For example, standard water shutoffs utilize valves that require manipulation to turn them off and can be difficult for some individuals to access and/or operate. It is desirable, in accordance with certain embodiments, to enable a non-tradesman to shut off water in a safe manner prior to calling for assistance. Service calls for plumbing assistance can be reduced in duration by providing, in accordance with certain embodiments, an easily accessible and operable shutoff for a water source that can be activated by, for example a plumber, during a plumbing repair. Also, in accordance with certain embodiments, by automating the shutoff of a water supply in the event of excessive water usage, indicative of a broken water pipe, the risk of a potentially huge amount of water damage and possible mold growth can be reduced in the event of a broken pipe. The water supply can also be shut off in the event of the undesirable back flow of water to, for example, reduce the risk of drainage of water from a water heater.

DETAILED DESCRIPTION

The disclosure below describes a number of embodiments of apparatus for sensing water flow in a pipe, such as in a water supply to a building. Desirably, both forward flow and back flow is sensed. In response to signals from the water flow sensor indicating undesirable water flow, the supply of water to a building can be shut off.

Embodiments are also disclosed in combination with shutting off the electrical power to a water heater under certain conditions in the event a water flow sensor produces signals indicative of the flow of water to the building being interrupted. Although such constructions are desirable, it should be noted that the water flow control features may be implemented without the water heater power control features, if desired. In addition, various combinations and sub-combinations of features and elements disclosed herein, may be utilized. Our invention encompasses all novel and non-obvious combinations and sub-combinations of features and method acts disclosed herein and is defined by the claims below and does not require that any or all advantages disclosed herein be realized. Also, terms such as "a" are to be given broad construction to include one or more elements. Thus, if two or more of a given element are present, the requirement of "a" or "an" element is also met by the presence of two of such elements. Also, the word "includes" is to be broadly construed to have the same broad open-ended meaning as the word "comprises". Also, the term "coupled" or "coupling" includes the direct connection as well as indirect connection through one or more other elements. Also, elements may be separate standalone elements or combined with other elements even though, for convenience, they are described below as standalone or as combined. Finally, the examples and embodiments discussed below are not to be taken as limiting the scope of the invention.

Figure 1:
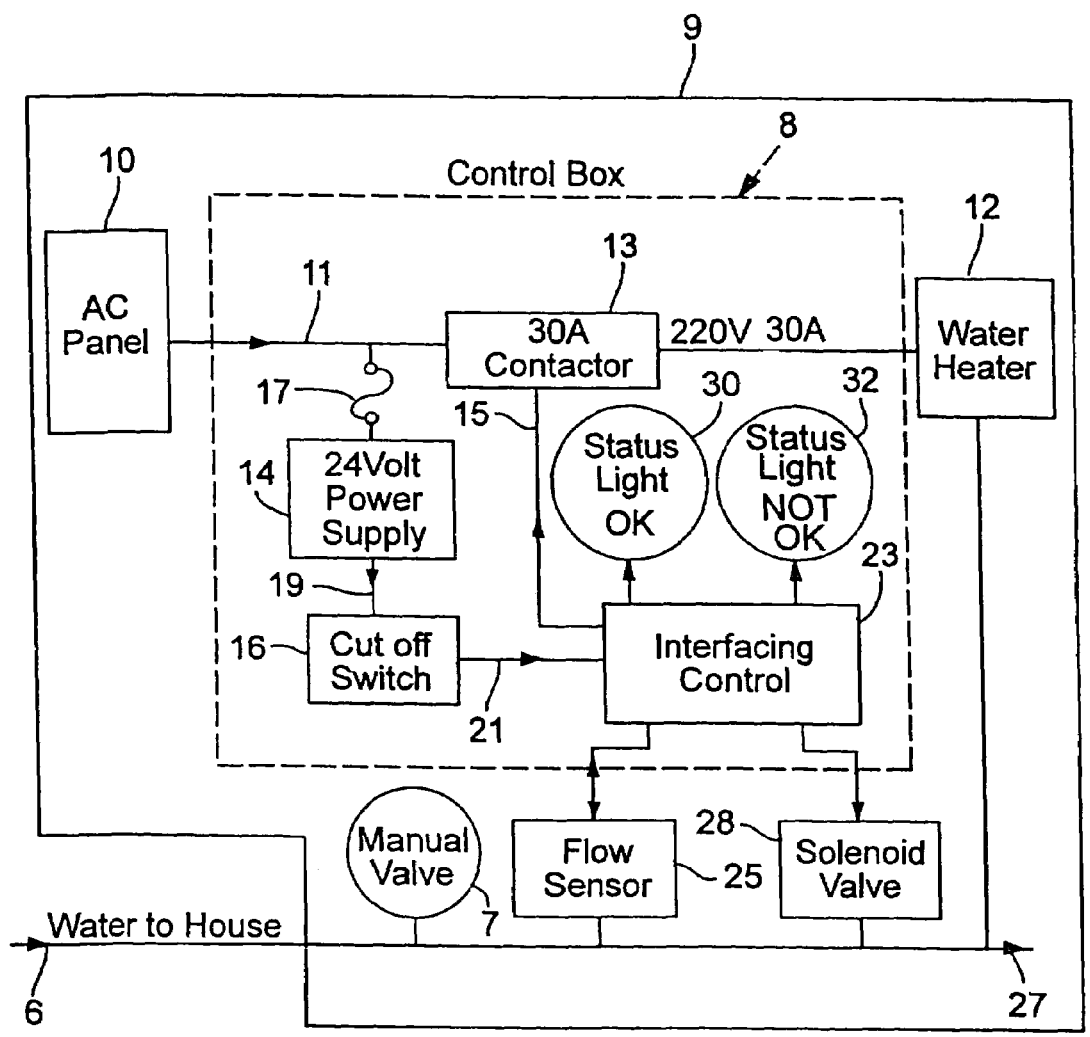
FIG. 1 is a block diagram of one embodiment of an apparatus in accordance with an embodiment.

With reference to FIG. 1, an electrical control box or housing 8 is shown wired in a position to control the delivery of power in an AC line between a conventional fuse/breaker box 10 of a building, such as a residence or house 9, and an electrical water heater 12 of the residence. A power line, such as a 220 volt alternating current supply protected by 30 amp fuses is indicated by line 11 and passes through control box 8. A conventional electrically controlled 30 amp breaker or contactor 13 is interposed in line 11 and is controlled via signals from a control line 15. Power from line 11 (e.g., from a 110 volt phase thereof) is delivered through a fuse 17 to a transformer (not shown) within a power supply 14 that operates to provide output power at a desired voltage level such as 24 volt DC power on line 19. Line 19 is connected in this embodiment to a manually operable cutoff switch 16 having an output 21 to an interfacing control 23. The control 23 is connected via line 15 to contactor 13. In addition, a flow sensor 25 is coupled to interface control 23.

Flow sensor 25 is operable to sense the flow of water in a water supply line or pipe 6 to the residence or other building. A manually operated shutoff valve 7 is also provided to permit manual control of the flow of water in line 6. Valve 7 may be, for example, inside or outside of the building and is typically positioned near where the water supply pipe enters the building. Although various types of flow sensors may be used, in one specific example, the flow sensor 25 may comprise one or more commercially available flow sensors. Alternatively, a flow sensor as described below in FIGS. 4-17 is particularly desirable.

A specific exemplary flow sensor desirably comprises a three position flow stick positioned in water supply line 6. A first or neutral position of the flow stick corresponds to no water flowing in line 6. A second or forward flow position corresponds to water flow in the direction of arrow 27, a normal flow direction, into the building. The water flows through pipe 6 to various water usage locations and appliances, such as water heater 12, hose bibs, sinks, toilets, ice makers, sinks and the like. In addition, flow sensor 25, in this example, has a third back flow indicating position corresponding to abnormal water flow in a direction opposite to arrow 27. Other forms of flow sensors may be used. For example, a device that only detects forward flow may be used in the event back flow detection features are eliminated. As another example, first and second two position flow sensors may be used with neutral and forward flow positions. By orienting one of these flow sensors in a reverse orientation, its forward flow position will actually detect back flow. Exemplary flow sensors are commercially available from Aqualarm of Chula Vista, Calif. (e.g., model 360LS).

Flow sensor 25, in this example, provides one or more electrical flow detection indicating signals to interfacing control 23, in this example, corresponding to the position of the flow stick of the flow sensor. The interface control 23 is also coupled to a water flow control valve 28, such as a solenoid controlled valve, that is selectively operable to shutoff (interrupt) or permit the flow of water in line 6 depending upon whether the valve is closed or open. Although other water flow valves may be used, one specific form of valve comprises a pulse activated solenoid valve that switches position (e.g., closed to open or open to closed) in response to the application of an electrical signal pulse to the valve. For example, assuming this exemplary form of solenoid valve 28 is in an open flow permitting position, upon delivery of an operating electrical pulse (a form of valve closing signal) to the solenoid of valve 28, the solenoid valve is caused to close. When the solenoid of valve 28 is again subjected to an operating electrical pulse (e.g., a form of valve opening signal), the valve 28 is caused to open. The solenoid valve of this example repetitively switches between open and closed positions in response to the operating pulses.

Status indicators, such as lights 30,32, desirably visible from the face of the control box 8, may be included to indicate the condition of the system. For example, one or more green lights may be on, as indicated by status light "okay" block 30 in FIG. 1, in the event solenoid valve 28 is open and electrical power is being supplied to water heater 12. In contrast, light 30 may be "off" and one or more "no okay" status lights, such as red lights, as indicated by block 32 in FIG. 1, may be on if either the valve 28 is closed or power is interrupted to the water heater, or both.

In operation of the FIG. 1 embodiment, assume there is a drop in water pressure due, for example, to a broken water pipe. In this case, cutoff switch 16 (which is one form of a manual actuator) may be manually operated to a shutoff position. In response to a corresponding electrical signal from the cutoff switch, interface control 23 sends a pulse to solenoid valve 28 causing the valve 28 to close the water supply line 6 to the building. In addition, in this embodiment, a signal from interface 23 is sent via line 15 to contactor 13 causing the contactor to open to thereby shut off power to the electrical water heater. This prevents the water heater elements from burning out in the event the water heater drains due to the broken water pipe. If the bypass switch 16 is returned to its on position, contactor 13 again closes, re-energizing the water heater and a pulse is sent to solenoid valve 28 causing the valve to open to thereby permit the water to flow in line 6. In the event a plumbing repair is needed, the plumber can move switch 16 to its shut off position, resulting in de-energization of the water heater elements and closing of the valve 28. The switch position can be reversed after the repair is completed.

In systems where an optional water flow sensor, such as sensor 25 or a sensor such as described below in FIGS. 4-17, is included, and this is desirable, the water flow can be monitored by the interface to determine whether excessive water use has occurred. For example, forward water flow can be monitored to determine whether the water has been on for an excessive period of time. For example, the duration of time that a flow stick remains in the forward flow position can be monitored to see if an "excessive water flow time" threshold is reached or exceeded. This threshold or "water flow" period of time may be preset, for example at four hours. This period of time may also be variable, but again is more typically preset in advance. The threshold may be adjusted and then preset to the adjusted level. In the event a signal from flow sensor 25 indicates forward flow of water in line 6 (in the direction of arrow 27) for a time in excess of the threshold, excessive water flow is indicated. In this event, the interface control sends a signal to solenoid valve 28 causing the valve to close and shut off the source of water to the building. In addition, the interface control desirably also sends a signal via line 15 to contactor 13 causing the contactor to open to shut off the power to the water heater elements. In the event of water flow in the reverse or backflow direction (opposite to arrow 27), flow sensor 25 detects this backflow of water and sends a backflow indicating signal to interfacing control 23. Prior to closing the valve under back flow conditions, back flow for a period of time that meets or exceeds a threshold (e.g., at least at the threshold) may be required. This backflow threshold may be preset, varied and adjusted such as previously described for the forward flow direction. In response, the valve may be operated to shut off the valve and water supply to the building and power to the water heater may be interrupted as previously described.

An alternative embodiment of an exemplary apparatus will next be described with reference to FIGS. 2 and 3.

Figure 2:
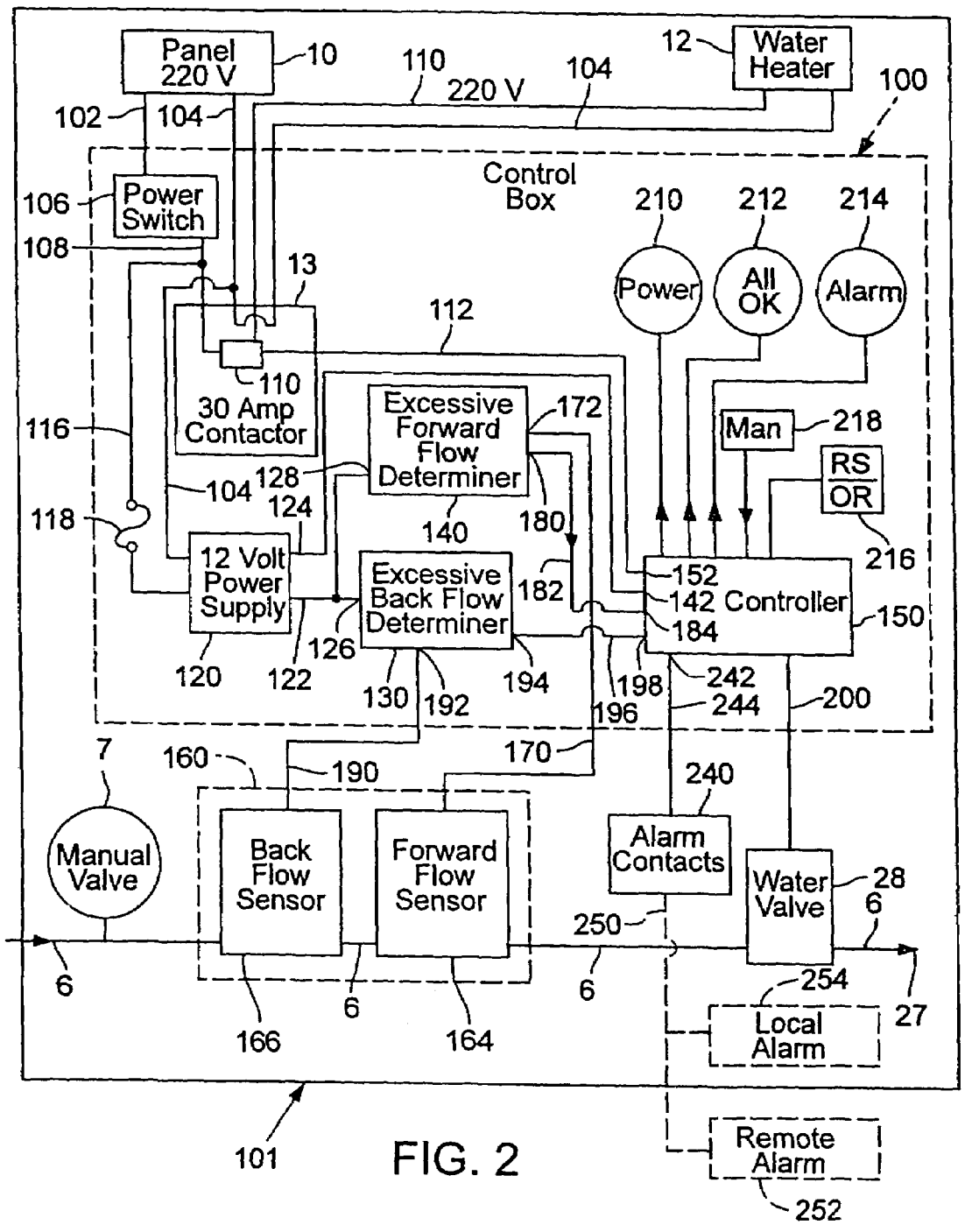
FIG. 2 is a block diagram of an alternative embodiment.

With reference to FIG. 2, an alternative form of electrical control box 100 is shown wired in a position to control the delivery of power in an AC line between a conventional fuse/breaker box 10 of a building 101 and an electrical water heater 12 for the building. In FIG. 2, numbers in common with some of the numbers shown in FIG. 1 have been used for similar components. A power line, such as a 220 volt alternating current supply 102 protected by 30 amp fuses in the panel 10 enters the control box 100. The neutral 104 is also shown in this figure. The two-phase hot leg wires along line 102 may be turned on and off by a conventional power switch or breaker 106 in control box or housing 100 to electrically isolate the control box from panel 10. Bypass switches (not shown) may be used to selectively couple water heater 12 directly to the panel 10 if desired. From power switch 106, the two-phase 220 volt power passes through a conventional electrically controlled 30 amp breaker or contactor 13. More specifically, two-phase power lines 108 pass through contacts 110 that are controlled by signals from a control line 112. When contacts 110 are closed, the two-phase power is delivered via a line 110 to the water heater 12. Power to water heater 12 can be shut off in this embodiment by opening the contacts 110 of contactor 13. Conversely, power to the water heater 12 may be turned on by closing the contacts 110. Power from lines 108 (e.g., from a 120 volt phase thereof) is delivered via line 116 and through a fuse 118 to a transformer (not shown) within a power supply 120 that operates to provide output power at a desired voltage level, such as 12-volt DC power on respective output lines 122,124. Line 122 is coupled to respective power inputs 126,128 of a respective excessive backflow determiner 130 and an excessive forward flow determiner 140. In addition, power from power supply 120 is delivered via line 124 to a power input 142 of a controller 150, an example of which is explained below. The illustrated form of controller 150 has an output 152 to which the line 112 is coupled to provide control signals from the controller to the contactor 13. For example, a 5-volt signal may be delivered from controller 150 to contactor 13 whenever the contacts 110 of contactor 13 are to be opened.

A flow sensor 160 is shown for sensing the direction of water flow in waterline 6. Normal flow in line 6 is indicated again by the direction arrow 27. Although other forms of flow sensors may be used, such as previously described, or as described below in connection with FIGS. 4-17, flow sensor 160 comprises a forward flow sensor 164 and a backflow sensor 166. As specific examples, and not by way of limitation, an exemplary forward flow sensor is an FPT Model 306-LF-CPVC one inch not low flow sensor from Aqualarm of Chula Vista, Calif. In addition, an exemplary backflow sensor can comprise a pressure switch loop that determines a reduction in pressure, corresponding to backflow of water through line 6. An exemplary backflow sensor is a pressure switch gauge No. 7-100/switch-DC from Irrometer Company, Inc., of Riverside, Calif.

In the event sensor 164 senses forward flow of water in line 6, a signal (e.g., a 5-volt signal) is provided from sensor 164 via line 170 to an input 172 of the excessive forward flow determiner 140 for the duration of the time that the forward flow of water is sensed. In one specific example, excessive forward flow determiner can comprise a timer that commences timing upon receipt of the appropriate signal at input 172 with timing continuing while the signal is present. A forward flow threshold can be preset. The forward flow time threshold can be varied or adjusted. As a specific example, the threshold may be set in the range of from three to eight hours with one specific example being a four hour predetermined threshold time. If the timer times out (e.g., the threshold is reached indicating that forward flow of water has been continuously detected for four hours in this example) an excessive forward flow signal is provided at output 180 from the excessive forward flow determiner 140 and via line 182 to an input 184 of the controller 150. In response, as explained below, the controller can control the closing of the water flow control valve 28 and thus the flow of water in water pipe 6 to thereby shut off the excessive forward flow. In addition, the controller can provide a power shut off signal at output 152 and via line 112 to contactor 13 to cause power to water heater 12 to be shut off under such excessive forward flow conditions.

In the event backflow of water is detected in line 6, e.g., by sensor 166, a backflow detection signal (e.g., 5-volt signal) is provided via line 190 to an input 192 of the excessive backflow determiner 130. Excessive backflow determiner can operate in the same manner as excessive forward flow determiner. For example, excessive backflow determiner may be a timer that commences timing upon receipt of the backflow indicating input signal at input 192. Excessive backflow determiner in one form is operable to provide an excessive backflow indicating output signal at 194 and via line 196 to an input 198 of the controller in the event backflow is detected for a period of time determined by the timer of this exemplary excessive backflow determiner. The time may be a predetermined time and may be varied or adjustable. For example, backflow detection of from one second to one minute with a narrower range of from three to six seconds can be taken as a reliable indicator of undesirable backflow of water in water line 6. Other parameters, such as discussed above, may be detected and used to determine backflow. As a specific example, Velleman T/N No. K8015 timer kits from Velleman Company of California may be used both for the excessive forward flow determiner 140 and the excess backflow determiner 130.

Upon receipt of an excessive backflow signal at input 198 from the excessive backflow determiner 130, the exemplary controller 150 is operable, as explained below, to cause water valve 28 to close to thereby block or interrupt the flow of water in water line 6 (e.g., the backflow of water in this case). In addition, controller 150, via a control signal on line 112 to contactor 13, desirably causes the shutoff of power to the water heater 12. Valve control signals from the controller 150 via line 200 are provided to control the operation of the illustrated water valve 28.

A plurality of indicator lights can be provided, for example at the face of the housing or control box 100. Exemplary indicator lights (ground wires not being shown in these figures) comprise a power indicating light 210 which, when lit, indicates that power is being provided to the controller 150. A normal operation or "all okay" indicator light 212 can be provided to indicate the system is operating in a normal mode with power being supplied to water heater 12 and valve 28 being opened to permit the flow of water along line 6. An "alarm" or not okay indicator light 214 can also be provided to indicate that valve 28 has been closed and that power has been shut off to water heater 12.

It should be noted that, although less desirable, power to water heater 12 may not be controlled with the control being limited to controlling the flow of water through line 6 to interrupt the flow in the event of excessive forward water flow, excessive backflow water, or, most desirably, excessive flow in both direction determinations. In addition, the system can be operable to automatically recheck for continued backflow or forward flow, e.g., often a period of time with the system being reinitialize the system to an "all okay" condition if backflow or forward flow is no longer detected. This is less desirable than the example in which resetting is required in the event either excessive forward flow or excessive backflow is determined before the system is reinitialized.

As shown in FIG. 2, the exemplary apparatus also includes a reset or override actuator, such as a switch 216 that is, for example, manually actuated to provide a signal to the controller which then causes the reopening of valve 28 and reestablishment of electrical power to the water heater 12 following an excessive forward flow or excessive backflow determination. In addition, a manually actuated switch 218 is desirably provided. Switch 218 when actuated provides a signal to a controller resulting in the controller operating to cause water valve 28 to close and can also cause the shutting off of power to the water heater 12. Thus, switch 218 can operate like cutoff switch 16 to provide a convenient way for someone to turn off the water to the building without having to locate and operate a manual valve 7 that may be at the street, underneath the house, or at some other inconvenient location.

The apparatus illustrated in FIG. 2 also comprises optional alarm contacts or notification circuitry 240. In the event of alarm conditions (e.g., controller has caused water valve 28 to close and power to the water heater to be shut off due to excessive water forward flow or backflow) a signal can be provided from an output 242 via a line 244 to the alarm contact circuit 240. The alarm contact circuit can provides an alarm signal via a connection 250 (which may be hard-wired, e.g., a cable or telephone line or a wireless or satellite connection) to, for example, a remote alarm detecting location 252. In addition to or alternatively, for example, an e-mail or text message can be sent to the owner's computer, cell phone or internet connecting phone to alert the owner. As another example, location 252 may be (in addition to or alternatively) a security company's offices which remotely monitors burglar and other alarms and which has been set up for monitoring water conditions at a building in which the apparatus 100 is installed. In response to the detection of the remote alarm, the alarm monitoring company can send out a plumber or other inspector for the purposes of determining the source of the problem (e.g., a broken pipe) so that cleanup can commence before, for example, significant damage from is caused by standing water. In addition, the alarm contacts 240 may be coupled to a local alarm 254 such as a strobe light, siren or other alarm indicator at the building (or exterior thereof) itself.

Figure 3:
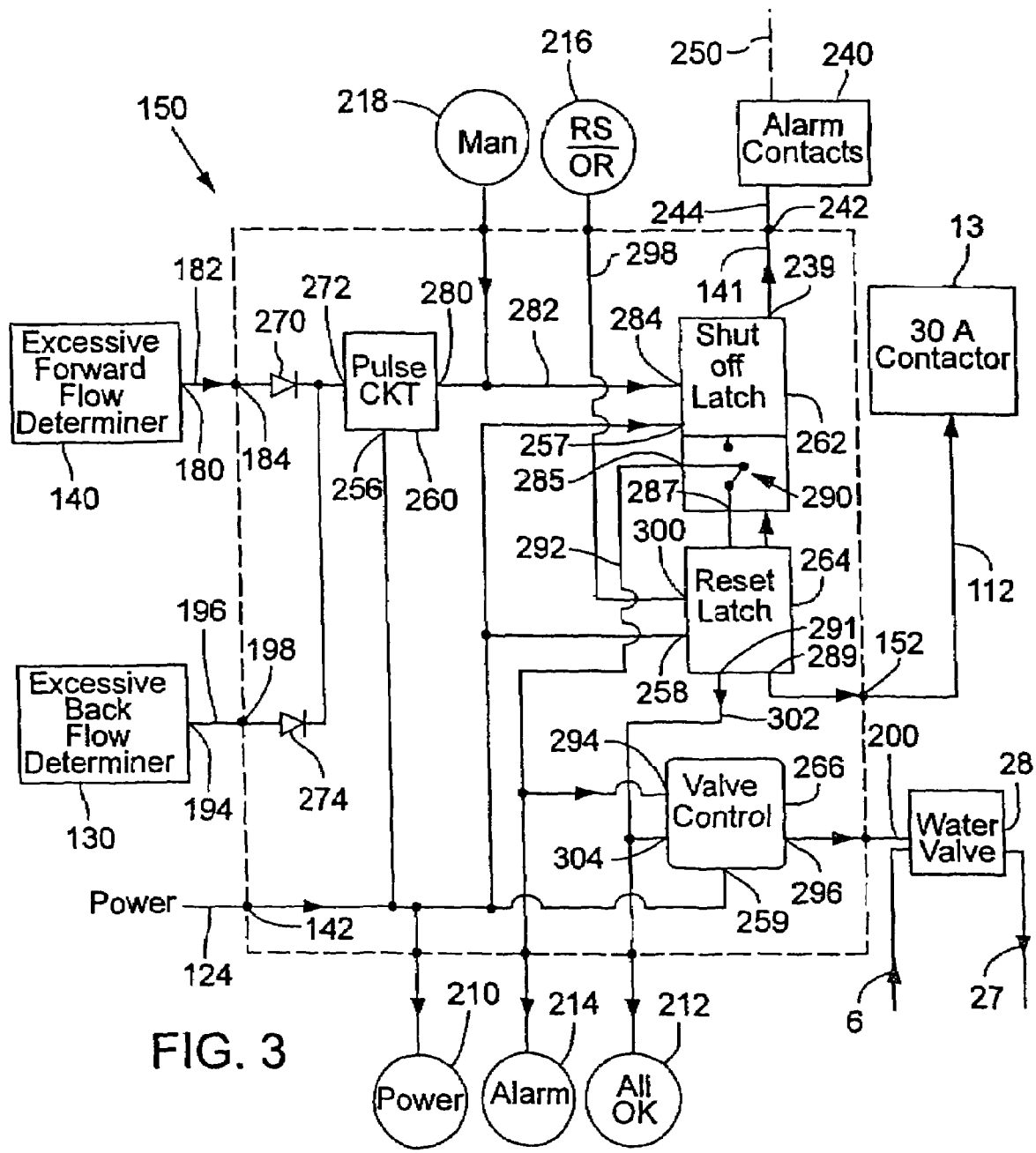
FIG. 3 is a block diagram of an exemplary controller that can be used in the FIG. 2 embodiment of the apparatus.

An exemplary embodiment of a suitable controller 150 or flow monitoring circuit is shown in FIG. 3. In the controller of FIG. 3, power from line 124 delivered to input 142 of the controller 150 and is delivered via various conductors to power inputs 256, 257, 258 and 259 respectively of a pulse circuit 260, a shutoff latch 262, a reset latch 264 and a valve control 266. The excessive forward flow indicating signal from line 182 is delivered to input 184 of controller 150 through a diode 270 and to an input 272 of the pulse circuit 260. In addition, the excessive backflow indicating signal from line 196 is delivered to input 198 of the controller 150 and through a diode 274 and to the input 272. Under normal operating conditions (no excessive forward flow determination and no excessive backflow determination), the output 280 from pulse circuit 260 along line 282 to an input 284 of shutoff latch 262 is at a level which causes the shutoff latch to remain in an unlatched state. The shutoff latch is indicated functionally as including a switch 290. Under these conditions, the switch 290 is open such that the value of the voltage signal from an output 285 of shutoff latch 262 via line 292 to an input 294 of the valve control 266 is at a low level and the alarm light 214 (coupled to line 292) is de-energized. Also, the water heater contactor 13 is closed (due to the level of the signal at an output 289 of reset latch 264) so that power is supplied to the water heater.

In contrast, in the event an excessive forward flow determination or excessive backflow determination is made, the output 280 from pulse circuit 260 changes state resulting in the delivery of an excessive water flow signal to input 284 of shutoff latch 262. In response, switch 290 shifts position, resulting in a change in the voltage of the signal (e.g., it assumes a high voltage level such as twelve volts DC) along line 292 to the valve control 266 and also resulting in power to the alarm indicating light 214. Under such conditions, an alarm indicating signal is delivered from latch output 239, via conductor 141 and output 242 of the controller via line 244, to the optional alarm contacts 240. In addition, a high voltage level signal is provided from shut off latch output 287 to reset the latch 264 causing the delivery of a signal at reset latch output 289 and via controller output 152 via line 112 to contactor 13. This results in turning off of the electrical power to the water heater. The voltage at reset latch output 291 also drops, resulting in turning off of "all okay" light 212 and a reduction in the voltage at input 304 to valve control 266 to a low voltage (e.g., zero voltage) level. The illustrated valve control circuit 266 may be a comparator that produces a positive output voltage when the voltage at input 294 is greater than the voltage at input 304 and a negative output voltage when the voltage at input 304 is greater than the voltage at input 294. In this case, with the changes in voltages at inputs 294,304 to the valve control circuit 266 a positive level voltage is provided from output 296 via line 200 to the water valve causing the valve to close. The valve may be a pulse activated valve which stays in the position to which it is shifted until a subsequent change in polarity of the actuating signal is received. For example, a Model 210 electric valve from Bermad of Anaheim, Calif. is one example of a suitable valve 28.

Upon actuation of the reset or override switch 216, a reset signal is provided via a line 298 to an input 300 of the reset latch 264, causing the switch 290 to shift back to the position shown in FIG. 3. When this occurs, the signals at 294,304 switch state so that valve control 266 provides a valve control signal at output 296 of a reverse polarity (negative) and the water valve 28 changes state (opens in this case). Also, upon resetting, the reset latch 264 provides a reset signal at output 289 and via line 112 to contactor 13, causing the contactor to close and repower the water heater. In addition, the signal via line 292 to the alarm light 214 is no longer high and the alarm light becomes unlit. Also, the signal at output 291 changes and is provided along a line 302 from the reset latch 264 to light 212 to cause light 212 to light up and indicate that conditions are acceptable. In addition under such conditions the signal from shut off latch 262, via output 239, line 141, connection 242 and line 244 to the alarm contacts 240 changes state so that the lack of an alarm condition is indicated.

Manual switch 218, when actuated to a shutoff position provides a pulse on line 282 that matches the level of the output pulse at 280 corresponding to water and power shutoff conditions. In this case, the shutoff latch 262 operates in the same manner as if excessive forward flow or excessive backflow had been determined. In this way, the manually actuated cutoff switch 218 may be used to shut off power to the water heater and to shut off the supply of water if desired. These conditions are then reversed by switching the manual switch to its unactuated state. Alternatively, the manual cutoff switch 218 may simply provide a pulse on line 282 to cause the above operation of the apparatus with the switch 218 then automatically returning to its unactuated state. In this case, the water valve and power will remain closed and power will remain off until the reset or override switch is again actuated. Switches 216 and 218 may be pushbutton switches. Also, the circuitry may be modified such that an alarm signal to alarm contacts 240 is blocked in the event the switch 218 has been actuated to shut off the water and power.

Assume that one of the above described embodiments is installed in a rental or vacation home and that a pipe freezes and breaks. In this case, the occupant will be able to easily shut off the water by operating switches 16 or 218 and power to the water heater will be turned off. This minimizes the risk of water damage to the rental unit and the risk of damage to the water heater until such time as a plumber is called. As another example, assume one of the above-identified embodiments has been installed in a vacation home or other building that is vacant for extended periods of time. In this case, if a broken water pipe occurs, the water will be shut off and power to the water heater disabled after excessive forward water flow or back flow is detected, such as after a time period of continuous forward or back water flow. Also, with this apparatus, it is easy to shut off the water and power to the water heater simply by operating the switches 16 or 218 in the event the building is to be vacant for a period of time (e.g., in the case of an infrequently used vacation home).

FIGS. 4-17 illustrate exemplary embodiments of other forms of water flow sensors 160 that can be used in the systems of FIGS. 1-3 above, as well as in other applications (e.g., sprinkler systems) where detection of forward and back flow of water in a conduit can be useful.

In accordance with one aspect of an embodiment, a flow sensor comprises a housing through which water can flow. A flow detector is positioned within the housing and is movable in one direction in response to the flow of water in a forward direction when water is flowing from an inlet toward an outlet of the housing. The flow detector is movable in another direction when water is flowing in a backward direction from the outlet toward the inlet. In one specifically desirable form, the flow detector comprises a switch actuator in the form of a flap pivotally supported within the housing for movement in directions corresponding to a direction of water flow through the housing. A circuit closer coupled to the flap operates to close a first circuit in the event of the forward flow of water through the housing, and to close a second circuit in the event water is flowing in the backflow direction. Although plural components can comprise the circuit closer, (e.g., separate elements for closing the respective circuits), in an exemplary desirable form, the circuit closer comprises a cam mounted to an actuator flap for engaging respective first or second electrical contacts to close the respective first and second circuits depending upon the direction of water flow and thereby to the direction of movement of the actuator flap. In a specific example, the cam itself forms a part of the respective first and second electrical circuits. The first and second contactors can comprise elongated contacts, such as contact rods, that are cantileverly supported within the housing in a position to make contact with the cam as the actuator flap is moved.

In a specific example, each contact rod can have an exposed distal end portion positioned to engage the cam when the actuator flap is moved in the direction that results in engagement of the contact. The contact rod can be supported within a sleeve that surrounds all but the exposed distal end portion that projects outwardly from the end of the sleeve. The contact rod of the example is free to move within limits defined by the clearance between an interior wall of the sleeve and the exterior of the contact rod. As a result, the contact rod can flex while remaining in contact with the cam as the actuator and cam continue to pivot from partially to more fully opened positions.

A biasing mechanism, such as a coil spring, elastic member or other bias force applying device can be coupled to the actuator, such as to the cam, for returning the actuator to a no flow indicating position.

Figure 4:
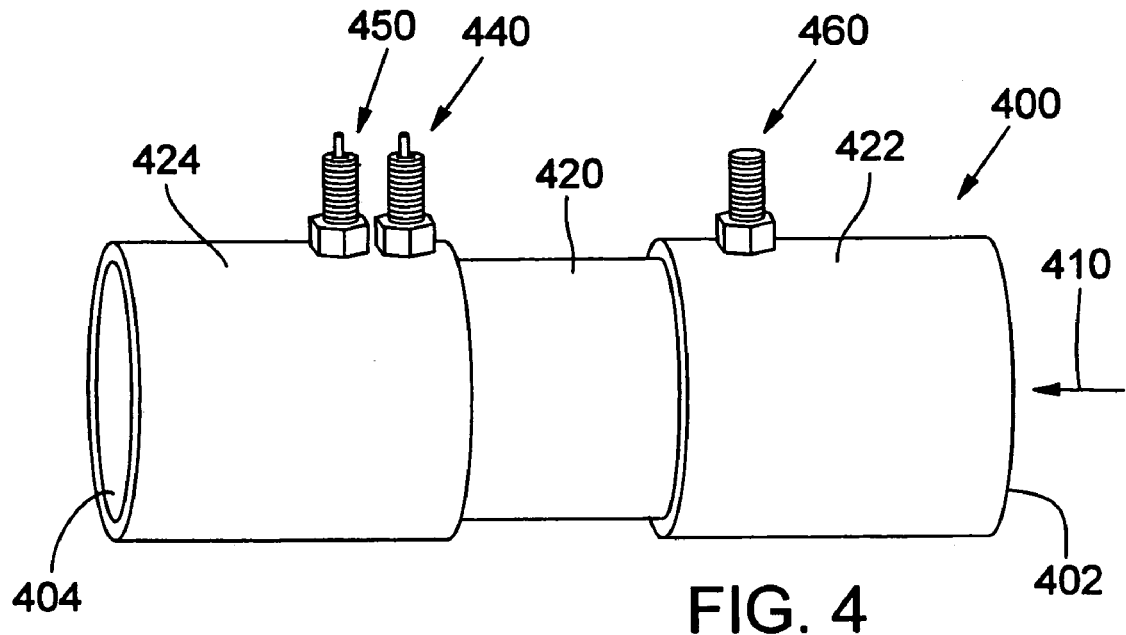
FIG. 4 is a side elevational view of one embodiment of a water flow sensor.
Figure 5:
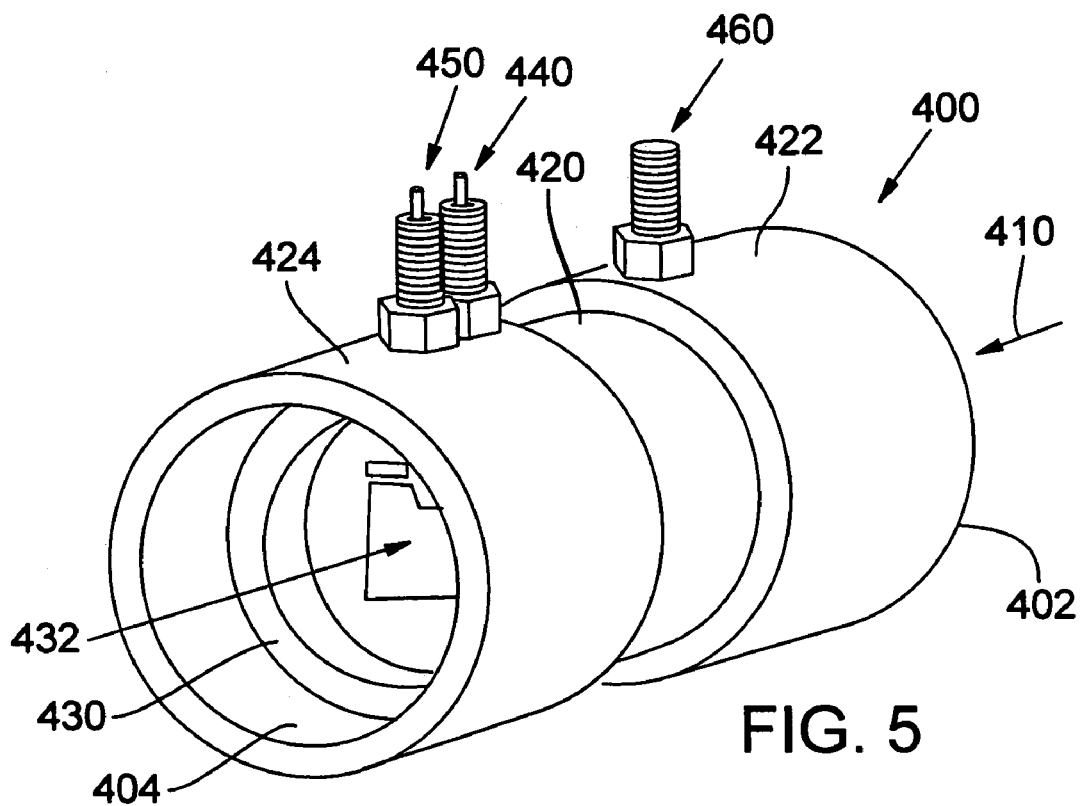
FIG. 5 is a view of the water flow sensor of FIG. 4 looking generally into one end thereof.

With reference to FIGS. 4 and 5, one embodiment of a water flow sensor comprises a housing 400 having an inlet 402 and an outlet 404. The housing defines a water flow passage therethrough between the inlet and the outlet. Water flow in a forward direction from the inlet toward the outlet is indicated by arrow 410 in these figures. The housing 400 can be tubular. Desirably, the housing has a diameter that is sized so as to have a flow through opening therethrough that is at least of a cross-sectional area equal to the cross-sectional area of a water supply conduit to which the housing is attached. It is not uncommon for residences to utilize one inch diameter water supply lines although this can be varied. In addition, commercial establishments often have larger water supply lines. The illustrated housing 400 comprises a central pipe section 420 with respective first and second pipe couplers 422 and 424 coupled to end portions of the pipe section 420. Standard pipe couplers, such as couplers 422 and 424, typically have an interior annular ridge, such as indicated by the number 430 in FIG. 5, to limit the depth of insertion of pipe components such as pipe section 420 into the coupler. Desirably, the housing is made of a material that is suitable for potable water transport for installations in building water supply lines. As one specific example, the housing components can be of CPVC. In such a case, the components 420,422 and 424 can be solvent welded together although other mechanisms for securing such components can be used. Alternatively, the housing may simply be formed of a single piece of pipe as, for example, couplers can be positioned on adjacent sections of the water supply line in the water circuit for the building.

The illustrated water flow sensor comprises a water flow direction detector and indicator indicated generally at 432 in FIG. 5. One specific exemplary form of such an indicator is described below. Also, the illustrated water flow detector comprises portions of an electrical circuit used to indicate the direction of water flow. The circuit components comprise a forward flow contact mechanism 440, a backflow contact mechanism 450 and a common contact mechanism 460. It is to be understood that these contacts are of a desirable configuration but that the embodiments can use other forms of electrical contacts.

With reference to FIGS. 6-14, an exemplary flow direction detector and indicator for coupling to the housing is illustrated. With specific reference to FIGS. 6 and 7, the illustrated flow indicator comprises an indicator support 470 for positioning within the housing. The illustrated support 470 comprises a plate structure 472 having first and second major surfaces 474,476 which can be planar. The illustrated plate 472 is annular (and in the form shown circular) with an edge 478. The plate 472 is positioned within the housing and secured in place. For example, plate 472 can be of CPVC (such as of ¼" CPVC) sheet material that is solvent welded or adhesively secured in place to the interior walls of the pipe section 420 of the housing with annular surface 478 bearing against and being secured to the interior housing wall. Other materials and fastening approaches can also be used.

Figure 7:
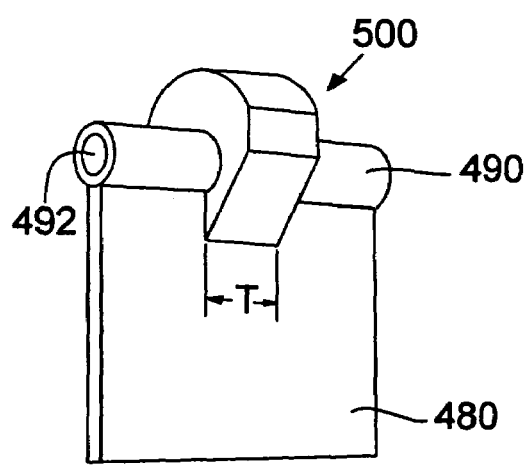
FIG. 7 is a perspective view of one form of a movable water flow indicator flap suitable for use in the embodiment of FIG. 6.

A flow direction indicator 480 is pivotally supported by a pivot 482 within an opening 484 through plate 472. This structure is more clearly visible in FIG. 10. With reference to FIG. 7, the flow indicator 480 may comprise a flap. The flap can be, but is not required to be, a planar plate-like flap secured at an upper edge to a sleeve 490. Although other materials can be used, in a potable water supply system, stainless steel is an exemplary material. For example, flow indicator plate 480 can be made of stainless steel, such as from 304 stainless steel sheet material. The sleeve 490 can also be made of a stainless steel, such as with $\frac{3}{16}^{th}$ i.d. heavy 304 stainless steel tubing. The flap and sleeve components 480, 490 can be secured together in any suitable manner, such as by welding. Sleeve 490 defines an interior passage 492 through which the pivot pin 482 can be inserted to pivotally couple the flap 480 to the plate 472. An exemplary pivot shaft is $\frac{3}{32}^{nd}$ inch 304 stainless steel welding rod. Again, other materials can be used and components can be combined.

A contact actuator is coupled to the flow indicator. For example, the contact actuator can comprise a cam 500 coupled to flap 480 and operable to engage the respective contacts 440 and 450 depending upon the direction of pivoting of the flap 480.

Figure 8:
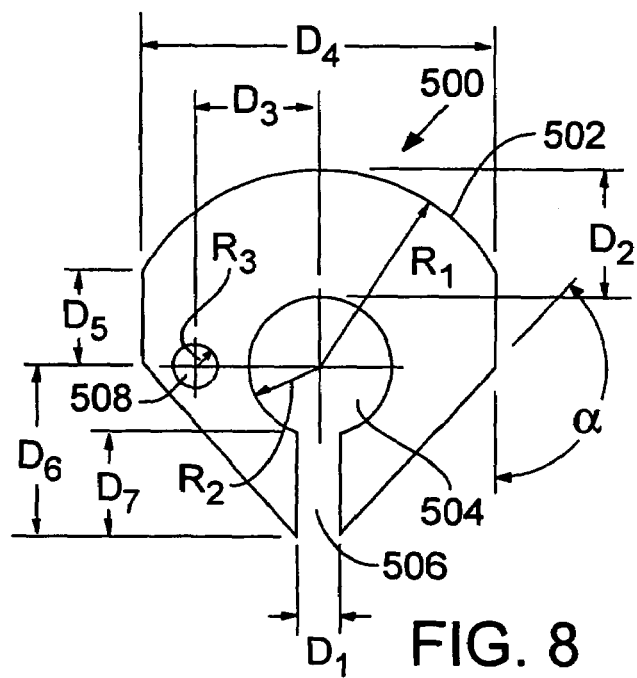
FIG. 8 is a side view of a cam using the embodiment of FIG. 7.

With reference to FIG. 8, the illustrated cam 500 comprises a contact engaging surface 502 which is desirably arcuate in configuration. For example, contact engaging surface 502 can be of an annular configuration, with a circular surface of radius $R_1$ being a particularly suitable example. Like the other components, for use in a potable water supply system, cam 500 is desirably constructed of a material suitable for such use, such as of stainless steel. For example, the cam can be machined from a stainless steel rod such as from a $\frac{9}{16}^{th}$ inch diameter 304 stainless steel rod in one example.

Table 1 below indicates exemplary dimensions for the exemplary cam of FIG. 8 for use in a system for a one inch diameter supply pipe. These dimensions can vary. The illustrated cam comprises a central opening 504, which can be circular, for receiving the sleeve 490. The cam 500 can also comprise a slot 506 for receiving an upper central edge portion of the flap 480. In addition, a biasing mechanism retainer receiving opening 508 (in this example, for receiving a biasing spring retainer) is also provided through the cam 500.

TABLE 1

| FIG. 8 ITEM | DIMENSION |
| --- | --- |
| α | 138° |
| R1 | 0.280 in. |
| R2 | 0.099 in. |
| R3 | 0.0325 in. |
| D1 | 0.063 in. |
| D2 | 0.188 in. |
| D3 | 0.171 in. |
| D4 | 0.492 in. |
| D5 | 0.136 in. |
| D6 | 0.244 in. |
| D7 | 0.150 in. |
| T | 0.250 in. |

Figure 10:
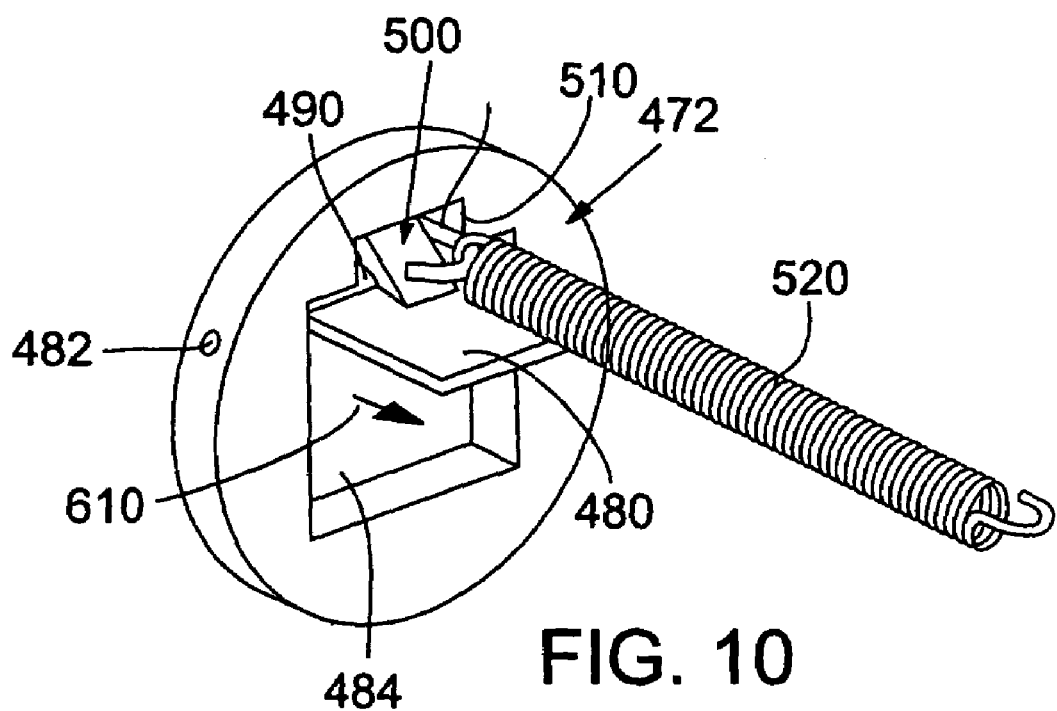
FIG. 10 is a perspective view of selected components from the embodiment of FIG. 6, with the water flow indicator shifted to a fully opened position in a reverse flow direction, in response to water flowing backwardly through the water flow sensor.

In the above Table, T represents the thickness of the cam as indicated in FIG. 7. As can be seen in FIG. 10, a cam accommodating cutout 510 is provided at the upper end of opening 484.

A biasing mechanism, in this example a biasing spring 520, is coupled at one end portion to a spring retainer 522 inserted into the opening 508 (FIG. 8) of cam 500. The opposite end portion of biasing spring 520 is inserted through an opening 524 at the lower end of contact 460 and retained therein. The spring, spring retainer and contact 460, as well as the cam 500, are desirably made in whole or in part of an electrically conductive material, such as of metal, with stainless steel being a specific example. These components can comprise part of an electrical circuit used to detect the direction of water flow through the apparatus. Alternative electrical connections can also be used, for example contact wires or strips carried by such components.

Figure 6:
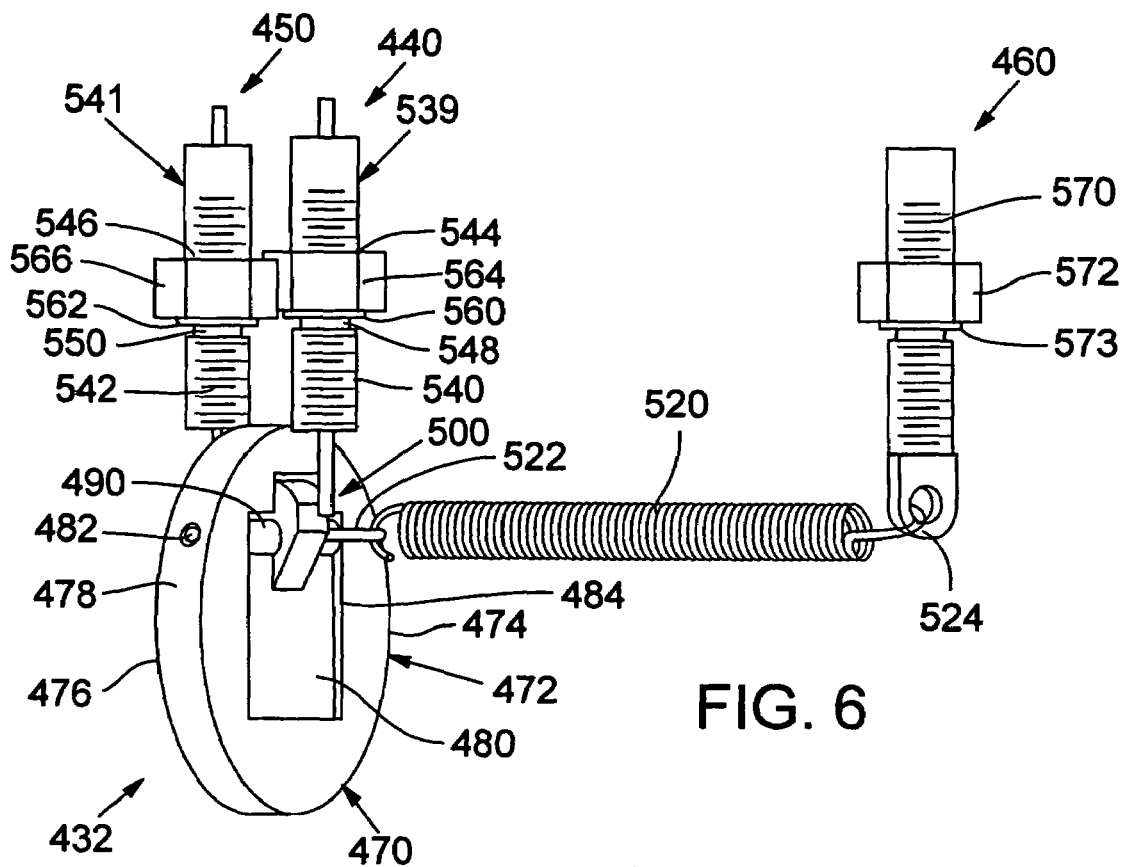
FIG. 6 is a perspective view of one embodiment of water flow detecting components that can be included in the apparatus of FIG. 4.

As can be seen in FIG. 6, the contacts 440,450 desirably each have a respective body 539,541 with respective lower threaded portions 540,542 and respective upper threaded portions 544,546. A respective central section 548,550, of reduced cross-sectional dimension is provided between the two threaded sections of each contactor. A respective seal, such as O-ring seal 560,562, is retained within an annular seat provided by the respective reduced cross-sectional dimensioned areas 548, 550. Respective nuts 564,566 are threaded onto upper threads 544,546. The lower portions 540,542 of contact bodies 539,541 can be threadedly inserted into respective threaded receiving openings in the housing. Following mounting in this manner, the nuts 564, 566 can be tightened to urge O-ring seals 560,562 against the exterior surface of the housing to provide a seal at this location. The contacts 440,450 need not be secured to the housing in this manner. For example, these contacts can be detachably secured in other manners, or adhesively or otherwise fixedly secured in place. In one specific example, the contact bodies 539,541 are formed from $5/16^{th}$ inch headless threaded stainless steel bolts. Although not required, the contact 460 also can be formed from a threaded bolt 570 that is threadedly received within a threaded receptacle of the housing. A nut 572 can be tightened against the housing following mounting of the contact 460 to press a seal, such as an O-ring seal 573, against the exterior surface of the housing to seal the housing at this location. Contact 460 can be made of the same material as contacts 440 and 450 (e.g., stainless steel) although the lower end of the illustrated contact 460 has a spring retaining opening 524 provided therein. The lower end of contact 460 can be machined to provide the opening 524, or a separate opening defining component can be mounted to contact 460. An exemplary biasing spring 520 is a ¼ inch diameter spring of 2 inch length formed of 0.031 inch diameter stainless steel wire material.

Figure 11:
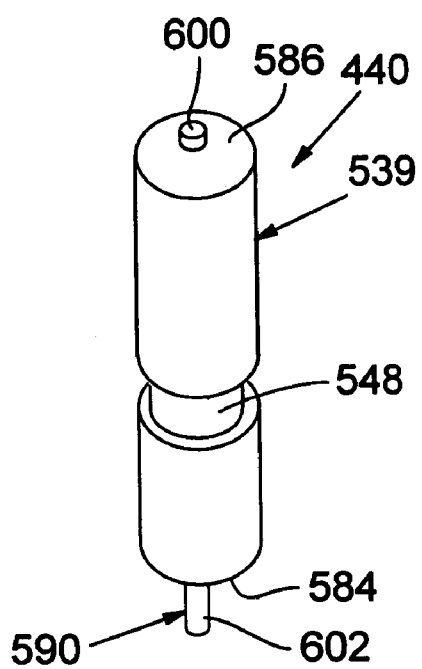
FIGS. 11, 12 and 13 are perspective views of one form of electrical contact usable in the embodiment of FIG. 1.
Figure 12:
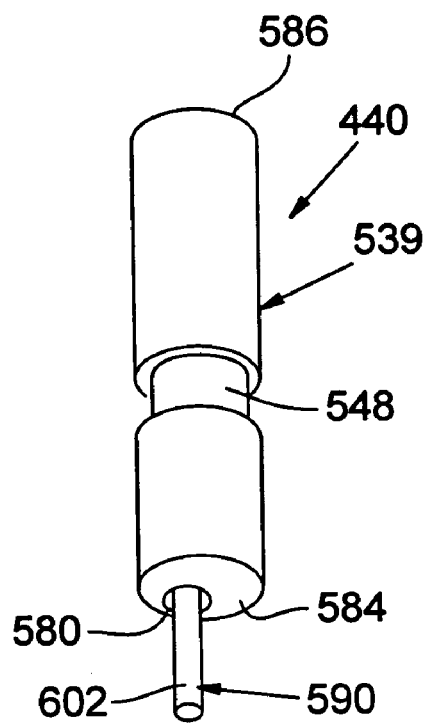
Figure 13:
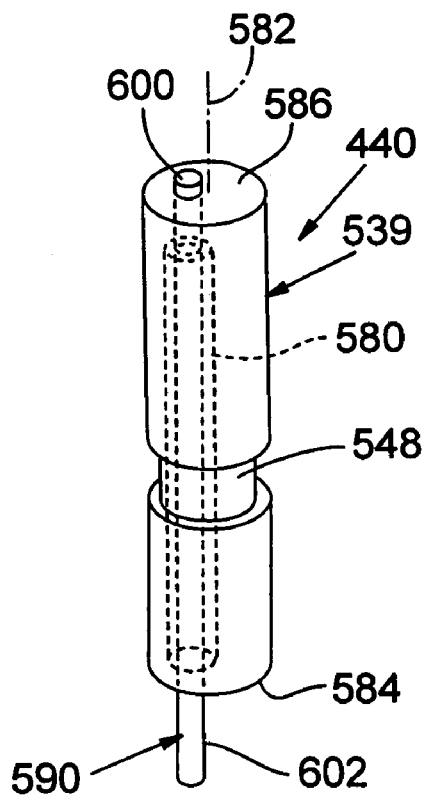

FIGS. 11-13 illustrate an exemplary form of one of the contacts 440 in greater detail. Contact 450 can be identical. For simplicity, the exterior threads 540 and 544 are not shown in these figures, although the annular seal receiving region 548 is shown. The illustrated contact 440 is provided with a longitudinally extending bore 580 that can be offset from the longitudinal axis of the illustrated contact 440. The longitudinal axis is indicated at 582 in FIG. 13. Bore 580 can extend entirely through the contact body 539. Alternatively, as shown in FIG. 13, the bore 580 can extend from the lower end 584 of body 539 toward the upper end 586 of body 539, but terminate short of the upper end 586. An elongated contact, such as a contact rod 590, is positioned within bore 580 with the upper end portion of the rod extending upwardly through the body 539 and beyond the surface 586. The projecting portion of contact 590 in these embodiments is indicated at 600 and provides a contact location for coupling or connection to an electrical conductor, such as a wire. The lower or distal end portion 602 of rod 590 projects downwardly below the surface 584 in these illustrated embodiments and is desirably exposed. The contact rod 602 desirably has a cross-sectional dimension that is less than the cross-sectional dimension of bore 580. In addition, the rod 590 in effect is cantilevered, in that support for rod 590 is provided by the upper end portion of body 539. The contact 600 can be electrically isolated from body 539 by, for example, disposing an electrical isolating material, such as resin, between the rod and body. If this approach is used, an electrical circuit can be closed by rod 602 being moved into engagement with the body 539 with the body comprising one side of an electrical switch and the contact 602 comprising the other side of the switch. Alternatively, in the illustrated embodiment, although desirable no electrical isolation is required inasmuch as contact 460 comprises one portion of an electrical circuit with either contact 440 or contact 450 comprising another part of an electrical circuit. The cam 500 engages the respective contact rods 602,602' (FIG. 14) for either the contact 440 or the contact 450 to close the associated flow direction indicating portion of the electrical circuit.

Figure 9:
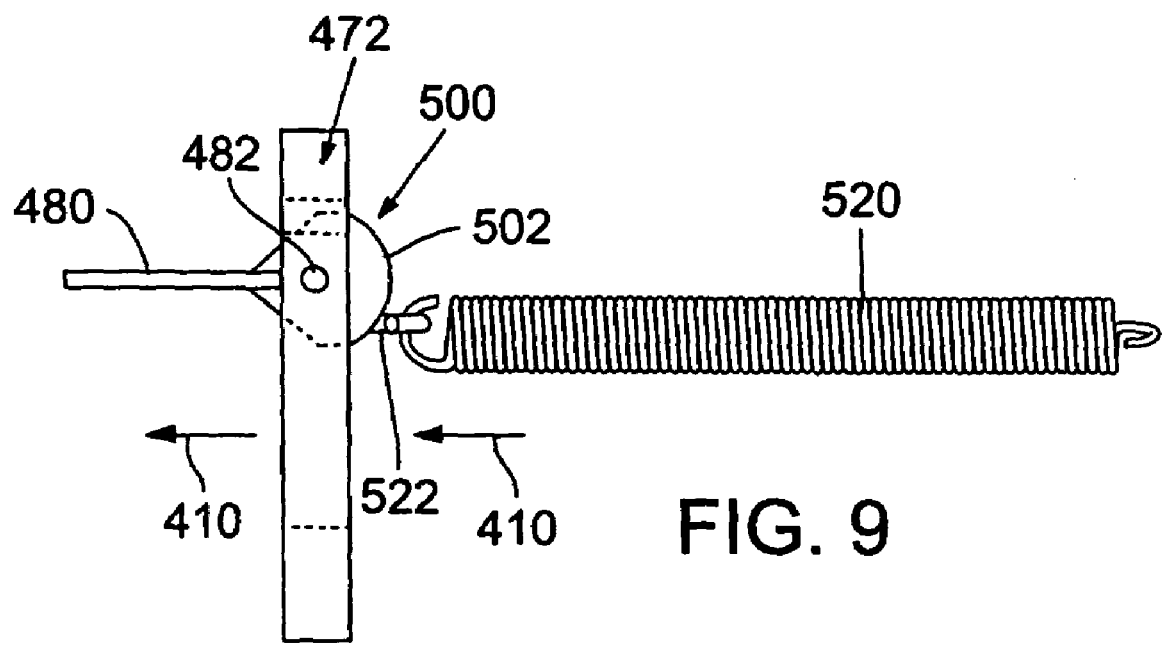
FIG. 9 is a side elevational view of selected components from the embodiment of FIG. 6, showing the water flow indicator flap shifted to a full open position in response to water flowing in a forward direction through the water flow sensor.

FIG. 9 illustrates the flap 480 shifted to a fully opened position in response to water flow in the forward direction 410. Note, for convenience the spring of FIG. 9 is not shown extended, although it would be under these conditions to provide a biasing force to return the flap 480 to its neutral position following the halting of forward flow.

FIG. 10 illustrates the positioning of flap 480 in the reverse flow or backflow position when water is flowing in the opposite direction from that shown in FIG. 9, such as indicated by arrow 610. The cross-sectional dimension of opening 484 may be varied with a one inch by one inch square being one specific example for a one inch diameter water supply pipe. Thus, the one inch by one inch flow through opening has a greater cross-sectional area than that of a one inch supply pipe and, when the flap 480 is fully open, the water flow sensor does not significantly restrict the flow of water through the water supply line. Clearance exists between the flap and edges of the opening in this example so that the flap can move in either direction through the opening.

Figure 14:
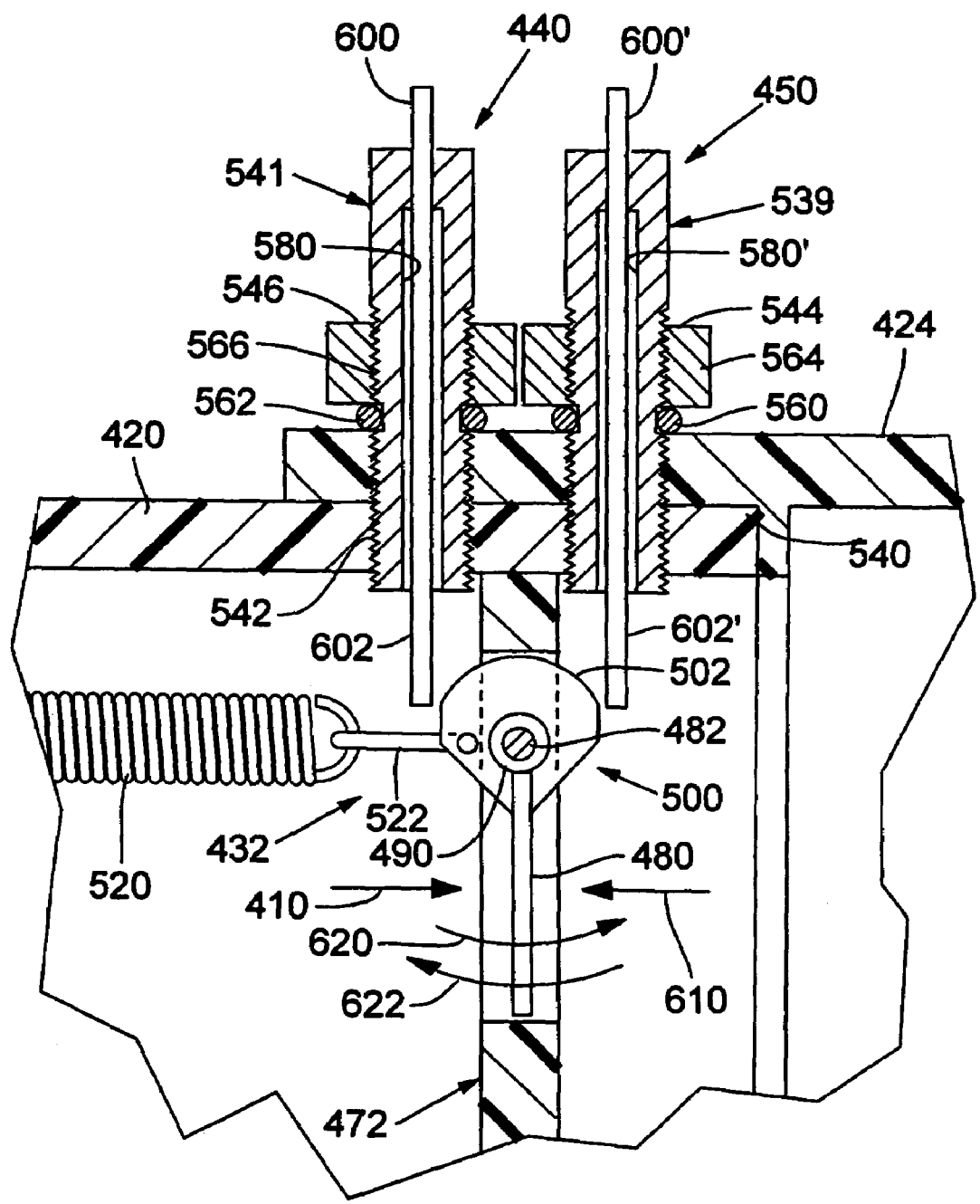
FIG. 14 is a vertical sectional view of a portion of the embodiment of FIG. 1.

With reference to FIG. 14, when water flows in the forward flow direction 410, flap 480 pivots in the direction of arrow 620 about pivot pin 482. When this happens, cam contact surface 502 is shifted into contact with the contact rod 602 and closes the electrical circuit comprising spring 520, retainer 522, cam 500 and contact 602. Continued pivoting of flap 480 in the direction of arrow 620 is permitted because contact 602 has flexibility to move within bore 580 so that the flap 480 can be shifted to the full open position. In contrast, in the event water flows in the backflow direction as indicated by arrow 610, flap 480 pivots in the direction of arrow 622, resulting in cam contact surface 502 engaging the distal end 602' of contact 450. This closes the electrical circuit including backflow indicating contact 450. Distal end 602' is permitted to move as the flap 480 shifts to its full backflow direction as a result of the clearance provided by bore 580'. The upper end of the contact rod of contact 450 is indicated at 600' in FIG. 14. Although the illustrated example including bores 580,580' is desirable, the bores can be eliminated.

Electrical contact can be made by other forms of contactors. However, the illustrated embodiments provide flexible contacts that allow movement of the flow indicator from partial flow indicating positions to full flow indicating positions while still maintaining electrical contact with the appropriate contact rod. The water flow sensor described above is especially suitable for low flow detection applications common in water supply lines such as up to 50 gallons per minute. The initial space in between cam surface 502 and the associated contact rods can be varied to establish a trigger flow rate or minimum that must be met before water flow is indicated, such as 0.5 gallons per minute.

Figure 15:
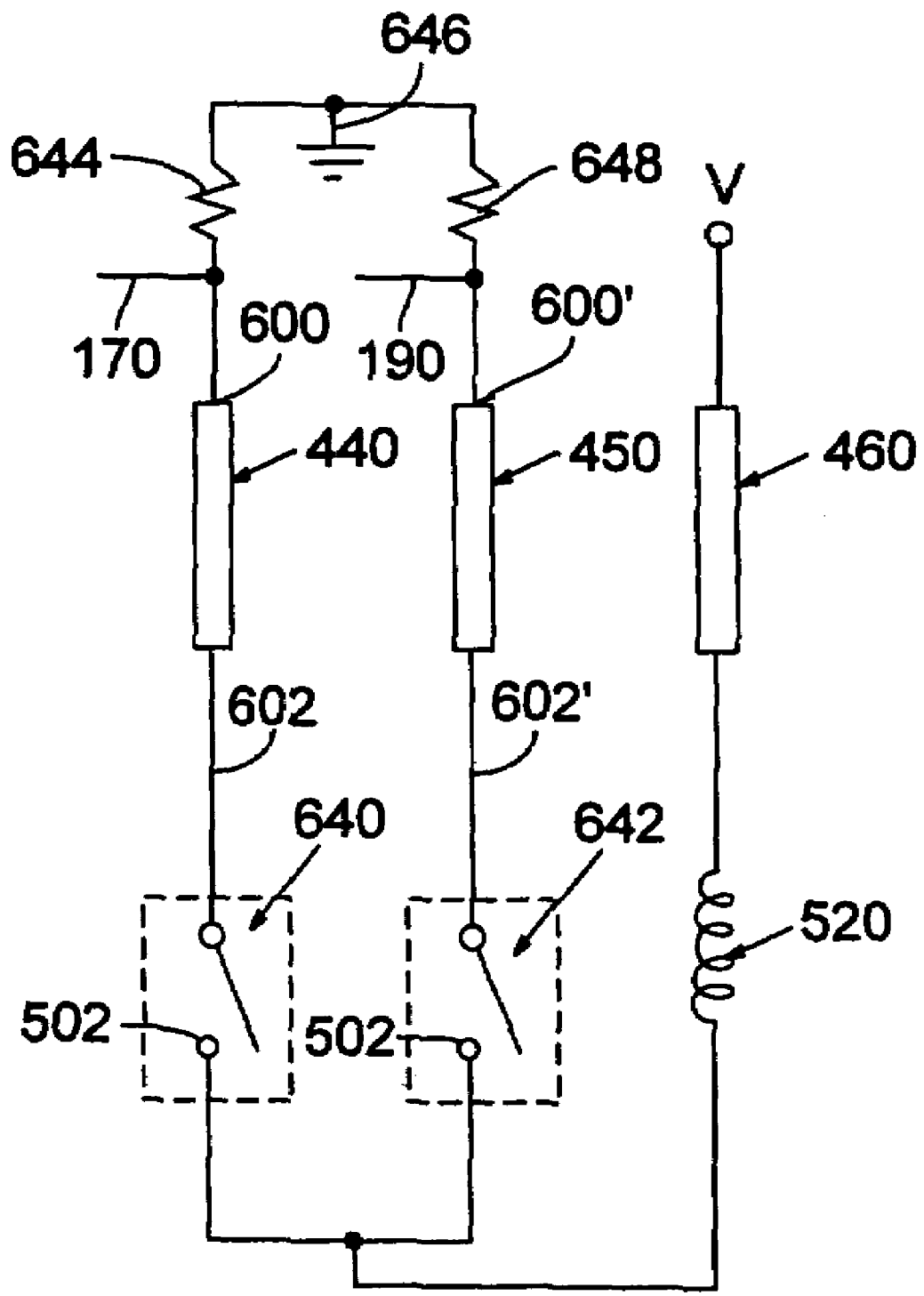
FIG. 15 illustrates one example of an electrical circuit that can be utilized to provide electrical signals indicative of the direction of water flow through the water flow sensor.

With reference to FIG. 15, an exemplary circuit for coupling to the contacts 440, 450 and 460 is shown. In FIG. 15, a switch 640 is used to schematically illustrate the interaction between cam surface 502 and the distal end 602 of contact 440, the switch being closed when the cam comes in contact with such distal ends. Likewise, a switch 642 is used to schematically illustrate the interaction between the cam surface 502 and the distal end 602' of contact 450 with switch 642 being closed when contact is made.

In the embodiment of FIG. 15, a voltage source V (such as 5 volts) is connected to contact 460 and via spring 520 to the cam (not shown in FIG. 15). When water flows in the forward flow position, the circuit through switch 640 is complete so that current flows through the circuit and a resistor 644 to ground 646. As a result, a positive voltage signal, such as 5 volts, appears on output line 170 (see FIG. 2). During these conditions, the switch 642 is open and a ground voltage is provided at output line 190 (see also FIG. 2). In contrast, under backflow conditions, the switch 640 is open while the switch 642 is closed. Under these conditions, current flows through contact 450 and a resistor 648 to ground 646. As a result, a positive voltage signal is provided (such as 5 volts) at output line 190 and a ground voltage appears at line 170.

Figure 16:
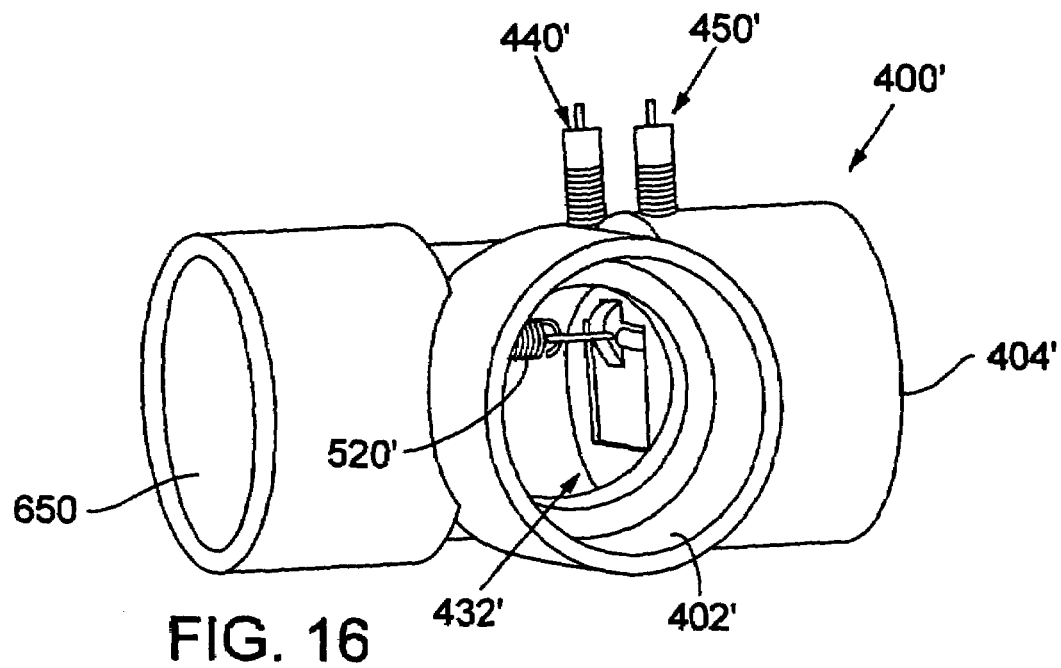
FIG. 16 illustrates an alternative embodiment wherein water turns as it flows through the water flow sensor.
Figure 17:
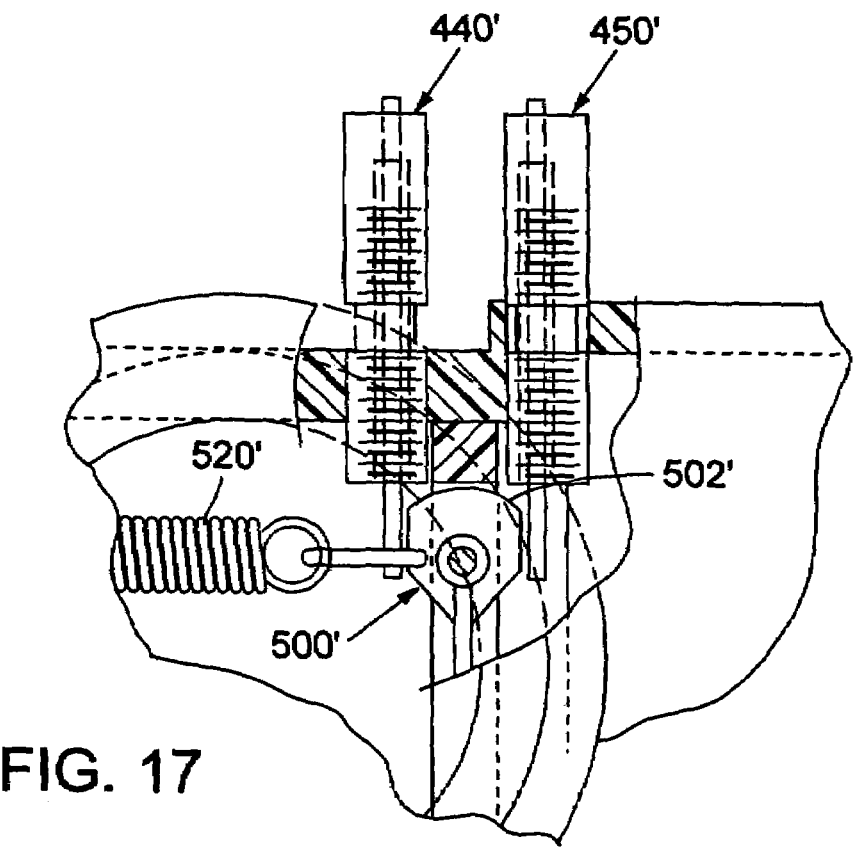
FIG. 17 is a partially broken away view of a portion of the embodiment of FIG. 16.

FIGS. 16 and 17 illustrate an alternative water flow sensor in accordance with another embodiment. In the embodiment of FIG. 16, the housing 400' (a prime being used to indicate components corresponding to the components of the FIG. 4 embodiment) comprises a T construction having an inlet 402' and an outlet 404' with water flowing between the inlet and outlet when in a forward flow direction. A water flow direction indicator 432' is positioned within the housing and can be identical to mechanism 432 previously described. Forward flow and reverse flow contacts 440' and 450' are also illustrated in FIG. 16. These contacts can be like the corresponding contacts 440 and 450 previously described. The spring 520' in the FIG. 16 example has an end portion coupled to cam 500' (FIG. 17) and an opposite end portion (not shown in these figures) that can be coupled to contact (such as like contact 460) secured to an end cap used to close the end 650 of the housing 400'.

Thus, FIGS. 4-17 illustrate exemplary embodiments of other forms of water flow sensors 160 that can be used in the systems of FIGS. 1-3 above, as well as in other applications (e.g., sprinkler systems) where detection of forward and back flow of water in a conduit can be useful.

Having illustrated and described the principles of our invention with reference to exemplary embodiments, it should be apparent to those of ordinary skill in the art that the invention may be modified in arrangement and detail without departing from the inventive principals. I claim all such modifications as fall within the scope and spirit of the disclosed technology.

We claim:

1. A water flow sensor for detecting the flow of water in forward flow and backflow directions through the sensor, the water flow sensor comprising:
    a housing comprising a body with an inlet and an outlet and defining a water flow passageway between the inlet and outlet;
    a flow detector pivotally coupled to the body and positioned at least partially in the passageway, the flow detector being pivotal about a flow detector pivot axis in a first direction in response to water flow in a forward flow direction from the inlet to the outlet, the flow detector being pivotal in a second direction about the flow detector pivot axis in response to water flow in a backflow direction from the outlet to the inlet;
    a first electrical circuit portion carried by the housing and comprising a first electrical contact and comprising selectively open first section that, when open, interrupts a first electrically conductive path of the first circuit portion;
    a second electrical circuit portion carried by the housing and comprising second electrical contact and comprising a selectively open second section that when open, interrupts a second electrically conductive path of the second circuit portion; and
    a first circuit closer coupled to the flow detector and pivotal about the flow detector pivot axis in one direction in response to pivoting of the flow detector in the first direction to a position such that a portion of the first circuit closer physically contacts the first contact to close the first section of the first electrical circuit portion, a second circuit closer also being pivotal about the flow detector pivot axis in another direction in response to pivoting of the flow detector in the second direction to a position such that a portion of the second circuit closer physically contacts the second contact to close the second section of the second electrical circuit portion.

2. A water flow sensor according to claim 1 wherein the housing comprises a tubular wall that defines the passageway and wherein the flow detector comprises a flow detector body coupled to the housing wall and extending inwardly into the passageway from the housing wall, the body having a water flow opening therethrough and a flap pivoted to the flow detector body for pivoting in first and second directions through the water flow opening.

3. A water flow sensor according to claim 2 comprising a biasing member coupled to the flap and operable to urge the flap to a position substantially within the water flow opening.

4. A water flow sensor for detecting the flow of water in forward flow and backflow directions through the sensor, the water flow sensor comprising:
    a housing comprising a body with an inlet and an outlet and defining a water flow passageway between the inlet and outlet;
    a flow detector pivotally coupled to the body and positioned at least partially in the passageway, the flow detector being movable in a first direction in response to water flow in a forward flow direction from the inlet to the outlet, the flow detector being movable in a second direction in response to water flow in a backflow direction from the outlet to the inlet;
    a first electrical circuit portion carried by the housing and comprising a selectively open first section that, when open, interrupts a first electrically conductive path of the first circuit portion;
    a second electrical circuit portion carried by the housing and comprising a selectively open second section that when open, interrupts a second electrically conductive path of the second circuit portion;
    wherein the flow detector comprises a flow detector body coupled to the housing and with a water flow opening therethrough and a flap pivoted to the flow detector body for pivoting in first and second directions through the water flow opening; and
    a first circuit closer coupled to the flow detector and movable in one direction in response to movement of the flow detector in the first direction to a position to close the first section of the first electrical circuit portion, a second circuit closer coupled to the flow detector and movable in another direction in response to movement of the flow detector in the second direction to a position to close the second section of the second electrical circuit portion;
    a first common electrical contact supported by the housing, an electrically conductive biasing spring coupled to the flap and to the first common contact; the common electrical contact and biasing spring each comprising a common portion of the first and second electrically conductive pathways of the first and second electrical circuit portions, the first and second circuit closers each being electrically conductive and being electrically connected to the biasing spring, a first electrical contact supported by the housing and comprising a portion of the first electrically conductive path of the first electrical circuit portion, a second electrical contact supported by the housing and comprising a portion of the second electrically conductive path of the second electrical circuit portion, the first circuit closer being coupled to the first section of the first electrical contact to close the first electrically conductive path in response to movement of the flap in the first direction, the second circuit closer being coupled to the second section of the second electrical contact to close the second section of the second electrically conductive path in response to movement of the flap in the second direction.

5. A water flow sensor according to claim 4 wherein the first and second circuit closers each comprise a portion of a common component.

6. A water flow sensor according to claim 4 wherein the first and second circuit closers each comprise a portion of a cam carried by the flap.

7. A water flow sensor according to claim 6 wherein the cam comprises an arcuate contact engaging surface and wherein the first and second circuit closers comprise portions of the arcuate contact engaging caming surface.

8. A water flow sensor according to claim 6 wherein the first and second electrical contacts comprise respective first and second elongated electrical contacts, the first elongated electrical contact being positioned for contacting engagement by the cam as the cam moves with the flap in the first direction, the second elongated electrical contact being positioned for contacting engagement by the cam as the cam moves with the flap in the second direction.

9. A water flow sensor according to claim 8 wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement.

10. A water flow sensor for detecting the flow of water in forward flow and backflow directions through the sensor, the water flow sensor comprising:

a housing comprising a body with an inlet and an outlet and defining a water flow passageway between the inlet and outlet;

a flow detector pivotally coupled to the body and positioned at least partially in the passageway, the flow detector being movable in a first direction in response to water flow in a forward flow direction from the inlet to the outlet, the flow detector being movable in a second direction in response to water flow in a backflow direction from the outlet to the inlet;

a first electrical circuit portion carried by the housing and comprising a selectively open first section that, when open, interrupts a first electrically conductive path of the first circuit portion;

a second electrical circuit portion carried by the housing and comprising a selectively open second section that when open, interrupts a second electrically conductive path of the second circuit portion; and a circuit closer coupled to the flow detector and movable in one direction in response to movement of the flow detector in the first direction to a position to close the first section of the first electrical circuit portion, a second circuit closer coupled to the flow detector and movable in another direction in response to movement of the flow detector in the second direction to a position to close the second section of the second electrical circuit portion;

wherein the flow detector comprises a flow detector body coupled to the housing and with a water flow opening therethrough and a flap pivoted to the flow detector body for pivoting in first and second directions through the water flow opening;

comprising a first common electrical contact supported by the housing, an electrically conductive biasing spring coupled to the flap and to the first common contact; the common electrical contact and biasing spring each comprising a common portion of the first and second electrically conductive pathways of the first and second electrical circuit portions, the first and second circuit closers each being electrically conductive and being electrically connected to the biasing spring, a first electrical contact supported by the housing and comprising a portion of the first electrically conductive path of the first electrical circuit portion, a second electrical contact supported by the housing and comprising a portion of the second electrically conductive path of the second electrical circuit portion, the first circuit closer being coupled to the first section of the first electrical contact to close the first electrically conductive path in response to movement of the flap in the first direction, the second circuit closer being coupled to the second section of the second electrical contact to close the second section of the second electrically conductive path in response to movement of the flap in the second direction;

wherein the first and second circuit closers each comprise a portion of a cam carried by the flap; wherein the first and second electrical contacts comprise respective first and second elongated electrical contacts, the first elongated electrical contact being positioned for engagement by the cam as the cam moves with the flap in the first direction, the second elongated electrical contact being positioned for engagement by the cam as the cam moves with the flap in the second direction;

wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement;

wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore; and wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore.

11. A water flow sensor according to claim 10 wherein the first contact support portion of each contact support is threadedly mounted to the housing.

12. A water flow sensor according to claim 10 wherein each of the contact supports is elongated with a longitudinal axis, and wherein the associated bore has a longitudinal axis that is offset from the longitudinal axis of the contact support.

13. A water flow sensor for detecting the flow of water in forward flow and backflow directions through the sensor, the water flow sensor comprising:
  a housing comprising a body with an inlet and an outlet and defining a water flow passageway between the inlet and outlet;
  a flow detector body coupled to the housing and positioned at least partially in the passageway, the flow detector body comprising a water flow opening therethrough, a water flow actuator pivoted to the water flow body for pivoting in first and second directions through the water flow opening, the water flow actuator being movable in a first direction in response to water flow in a forward flow direction from the inlet to the outlet, the water flow actuator being movable in a second direction in response to water flow in a backflow direction from the outlet to the inlet;
  a first electrical contact positioned for engagement by the water flow actuator in response to movement of the water flow actuator in the first direction and a second electrical contact positioned for engagement by the water flow actuator in response to movement of the water flow actuator in the second direction; and
  wherein detection of the engagement of the first electrical contact indicates water flow in the forward flow direction and detection of the engagement of the second electrical contact indicates water flow in the backflow directions;
  wherein the water flow actuator comprises a flap pivoted to the flow detector body for pivoting in first and second directions through the water flow opening;
  a cam carried by the flap; and
  wherein the first and second electrical contacts comprise respective first and second elongated electrical contacts, the first elongated electrical contact being positioned for camming engagement by the cam as the cam moves with the flap in the first direction, the second elongated electrical contact being positioned for camming engagement by the cam as the cam moves with the flap in the second direction.

14. A water flow sensor according to claim 13 wherein the first and second elongated electrical contacts each comprises a rod having a distal end portion extending into the water flow passageway, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement.

15. A water flow sensor for detecting the flow of water in forward flow and backflow directions through the sensor, the water flow sensor comprising:
  a housing comprising a body with an inlet and an outlet and defining a water flow passageway between the inlet and outlet;
  a flow detector body coupled to the housing and positioned at least partially in the passageway, the flow detector body comprising a water flow opening therethrough, a water flow actuator pivoted to the water flow body for pivoting in first and second directions through the water flow opening, the water flow actuator begins movable in a first direction in response to water flow in a forward flow direction from the inlet to the outlet, the water flow actuator being movable in a second direction in response to water flow in a backflow direction from the outlet to the inlet;
  a first electrical contact positioned for engagement by the water flow actuator in response to movement of the water flow actuator in the first direction and a second electrical contact positioned for engagement by the water flow actuator in response to movement of the water flow actuator in the second direction;
  wherein detection of the engagement of the first electrical contact indicates water flow in the forward flow direction and detection of the engagement of the second electrical contact indicates water flow in the backflow direction;
  wherein the water flow actuator comprises a flap pivoted to the flow detector body for pivoting in first and second directions through the water flow opening;
  a cam carried by the flap;
  wherein the first and second electrical contacts comprise respective first and second elongated electrical contacts, the first elongated electrical contact being positioned for engagement by the cam as the cam moves with the flap in the first direction, the second elongated electrical contact being positioned for engagement by the cam as the cam moves with the flap in the second direction;
  wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement; and
  wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore.

16. A water flow sensor according to claim 15 wherein each of the contact supports is elongated with a longitudinal axis, and wherein the associated bore has a longitudinal axis that is offset from the longitudinal axis of the contact support.

17. A water flow sensor for detecting the flow of water in forward flow and backflow directions through the sensor, the water flow sensor comprising:
- a housing comprising a body with an inlet and an outlet and defining a water flow passageway between the inlet and outlet;
- a flow detector pivotally coupled to the body and positioned at least partially in the passageway, the flow detector being movable in a first direction in response to water flow in a forward flow direction from the inlet to the outlet, the flow detector being movable in a second direction in response to water flow in a backflow direction from the outlet to the inlet;
- a first electrical circuit portion carried by the housing and comprising a selectively open first section that, when open, interrupts a first electrically conductive path of the first circuit portion;
- a second electrical circuit portion carried by the housing and comprising a selectively open second section that when open, interrupts a second electrically conductive path of the second circuit portion;
- a circuit closer coupled to the flow detector and movable in one direction in response to movement of the flow detector in the first direction to a position to close the first section of the first electrical circuit portion, a second circuit closer coupled to the flow detector and movable in another direction in response to movement of the flow detector in the second direction to a position to close the second section of the second electrical circuit portion;
- wherein the flow detector comprises a flow detector body coupled to the housing and with a water flow opening therethrough and a flap pivoted to the flow detector body for pivoting in first and second directions through the water flow opening;
- a biasing member coupled to the flap and operable to urge the flap to a position substantially closing the water flow opening;
- a first common electrical contact supported by the housing, the biasing member comprising an electrically conductive biasing spring coupled to the flap and to the first common contact; the common electrical contact and biasing spring each comprising a common portion of the first and second electrically conductive pathways of the first and second electrical circuit portions, the first and second circuit closers each being electrically conductive and being electrically connected to the biasing spring, a first electrical contact supported by the housing and comprising a portion of the first electrically conductive path of the first electrical circuit portion, a second electrical contact supported by the housing and comprising a portion of the second electrically conductive path of the second electrical circuit portion, the first circuit closer being coupled to the first electrical contact to close the first section of the first electrically conductive path in response to movement of the flap in the first direction, the second circuit closer being coupled to the second electrical contact to close the second section of the second electrically conductive path in response to movement of the flap in the second direction;
- wherein the first and second circuit closers each comprise a portion of a common component;
- wherein the first and second circuit closers each comprise a portion of a cam carried by the flap;
- wherein the cam comprises an arcuate contact engaging caming surface and wherein the first and second circuit closers comprise portions of the arcuate contact engaging caming surface;
- wherein the first and second electrical contacts comprise respective first and second elongated electrical contacts, the first elongated electrical contact being positioned for engagement by the cam as the cam moves with the flap in the first direction, the second elongated contact being positioned for engagement by the cam as the cam moves with the flap in the second direction;
- wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement;
- wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore;
- wherein the contact supports are each threadedly mounted to the housing; and
- wherein each of the contact supports is elongated with a longitudinal axis, and wherein the associated bore has a longitudinal axis that is offset from the longitudinal axis of the contact support.

18. For use in a building having a water supply pipe through which water is supplied to this building, water flowing in a first forward direction through the water supply pipe when water is being used in the building, the direction opposite to the first forward direction being a second backflow direction, an apparatus for selectively interrupting the flow of water through the water supply pipe comprising:
- at least one water flow sensor for detecting flow of water in first forward flow and second backflow directions, the water flow sensor providing water flow output indicating signals corresponding to the direction of water flow;
- a flow monitoring circuit coupled to the at least one water flow sensor so as to receive the water flow output indicating signals, the flow monitoring circuit being adapted to provide a first valve close signal in the event water flow in the first direction exceeds a first forward flow threshold and to provide a second valve close signal in the event water flow in other second direction exceeds a second backflow threshold;
- a valve coupled to the flow monitoring circuit and adapted to interrupt the flow of water through the water supply pipe in response to the first and second valve close signals;

the water flow sensor comprising:
a housing comprising a body with an inlet and an outlet and defining a water flow passageway between the inlet and outlet;
a flow detector body coupled to the housing and positioned at least partially in the passageway, the flow detector body comprising a water flow opening therethrough, a water flow actuator pivoted to the water flow body for pivoting in first and second directions through the water flow opening, the water flow actuator being movable in a first direction in response to water flow in a forward flow direction from the inlet to the outlet, the water flow actuator being movable in a second direction in response to water flow in a backflow direction from the outlet to the inlet;
a first electrical contact positioned for engagement by the water flow actuator in response to movement of the water flow actuator in the first direction and a second electrical contact positioned for engagement by the water flow actuator in response to movement of the water flow actuator in the second direction; and
wherein detection of the engagement of the first electrical contact indicates water flow in the forward flow direction and detection of the engagement of the second electrical contact indicates water flow in the backflow direction;
wherein the water flow actuator comprises a flap pivoted to the flow detector body for pivoting in first and second directions through the water flow opening;
a cam carried by the flap; and
wherein the first and second electrical contacts comprise respective first and second elongated electrical contacts, the first elongated electrical contact being positioned for camming engagement by the cam as the cam moves with the flap in the first direction, the second elongated electrical contact being positioned for camming engagement by the cam as the cam moves with the flap in the second direction.

19. For use in a building having a water supply pipe through which water is supplied to this building, water flowing in a first forward direction through the water supply pipe when water is being used in the building, the direction opposite to the first forward direction being a second backflow direction, an apparatus for selectively interrupting the flow of water through the water supply pipe comprising:
at least one water flow sensor for detecting flow of water in first forward flow and second backflow directions, the water flow sensor providing water flow output indicating signals corresponding to the direction of water flow;
a flow monitoring circuit coupled to the at least one water flow sensor so as to receive the water flow output indicating signals, the flow monitoring circuit being adapted to provide a first valve close signal in the event water flow in the first direction exceeds a first forward flow threshold and to provide a second valve close signal in the event water flow in other second direction exceeds a second backflow threshold;
a valve coupled to the flow monitoring circuit and adapted to interrupt the flow of water through the water supply pipe in response to the first and second valve close signals;
the water flow sensor comprising:
a housing comprising a body with an inlet and an outlet and defining a water flow passageway between the inlet and outlet;
a flow detector body coupled to the housing and positioned at least partially in the passageway, the flow detector body comprising a water flow opening therethrough, a water flow actuator pivoted to the water flow body for pivoting in first and second directions through the water flow opening, the water flow actuator being movable in a first direction in response to water flow in a forward flow direction from the inlet to the outlet, the water flow actuator being movable in a second direction in response to water flow in a backflow direction from the outlet to the inlet;
a first electrical contact positioned for engagement by the water flow actuator in response to movement of the water flow actuator in the first direction and a second electrical contact positioned for engagement by the water flow actuator in response to movement of the water flow actuator in the second direction;
wherein detection of the engagement of the first electrical contact indicates water flow in the forward flow direction and detection of the engagement of the second electrical contact indicates water flow in the backflow direction;
wherein the water flow actuator comprises a flap pivoted to the flow detector body for pivoting in first and second directions through the water flow opening and a cam carried by the flap;
wherein the first and second electrical contacts comprise respective first and elongated electrical contacts, the first elongated electrical contact being positioned for engagement by the cam as the cam moves with the flap in the first direction, the second elongated electrical contact being positioned for engagement by the cam as the cam moves with the flap in the second direction;
wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement;
wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore;
wherein each of the contact supports is elongated with a longitudinal axis, and wherein the associated bore has a longitudinal axis that is offset from the longitudinal axis of the contact support;
wherein the first and second elongated electrical contacts each comprises a rod having a distal end portion, the distal end portion of the first elongated electrical contact extending into the pathway traversed by the cam as the flap moves in the first direction, the distal end portion of the second elongated electrical contact extending into the pathway traversed by the cam as the flap moves in the second direction, the distal end portions being free to move within limits in response to movement of the cam so as to remain in contact with the cam from first engagement with the cam and as the cam continues to move in the same direction following the first engagement;

wherein each of the first and second electrical contacts comprises a contact support with a first contact support portion mounted to the housing, the contact support comprising a bore, the associated contact rod being cantileverly supported by the first contact support portion of the contact support and extending through the bore with the distal end portion of the associated contact rod projecting outwardly from the bore; and wherein each of the contact supports is elongated with a longitudinal axis, and wherein the associated bore has a longitudinal axis that is offset from the longitudinal axis of the contact support.

20. An apparatus according to claim 18 for use in a building having an electric water heater that is supplied with electrical power from an electrical panel and supplied with water from the water supply pipe, the apparatus comprising an electrical switch that is in response to a power off signal, is adapted to shut off the electrical power to the water heater, the flow monitoring circuit being coupled to the electrical switch and being adapted to provide the power off signal to the electrical switch in the event the flow of water through the water supply pipe has been interrupted in response to the valve close signal.

21. An apparatus according to claim 18 comprising a manually actuated actuator operable to generate a valve close signal upon manual actuation, the valve being coupled to the manually actuated actuator and responsive to the generation of the valve close signal upon such manual actuation to interrupt the flow of water through the water supply pipe.

22. An apparatus according to claim 18 comprising a reset actuator adapted to generate a reset signal upon actuation, the flow monitoring circuit being coupled to the reset actuator and the valve also being coupled to the reset actuator, the flow monitoring circuit being responsive to the reset signal to reset the flow monitoring circuit to the condition at which water flow in the first direction exceeding a first forward flow threshold and water flow in the second direction exceeding a second back flow threshold has not been determined, the valve being operable in response to the reset signal to open the valve so as to no longer interrupt the flow of water through the water supply pipe.

23. An apparatus according to claim 18 comprising a remote alarm signal generator for providing an alarm signal to a location remote from the building indicating the interruption of the water flow by the valve in response to the occurrence of water flow in the first direction exceeding the first forward flow threshold.

24. An apparatus according to claim 18 wherein the first and second thresholds are each time thresholds.

25. An apparatus according to claim 18 wherein the first and second thresholds are predetermined.

26. An apparatus according to claim 18 wherein the first and second thresholds are adjustable.

27. An apparatus according to claim 18 wherein the first threshold is greater than the second threshold.

28. An apparatus according to claim 18 wherein the flow monitoring circuit comprises an excessive forward flow determiner circuit for receiving a water flow output signal from the at least one flow sensor corresponding to forward flow of water, the excessive forward flow determiner monitoring the duration of time during which forward flow of water continuously exists, the excessive forward flow determiner providing a first excess forward flow signal corresponding to the first forward flow threshold when the duration of the continuous forward flow of water at least equals the forward flow threshold;

the flow monitoring circuit also comprising an excessive backflow determiner circuit for receiving a water flow output signal from the at least one flow sensor corresponding to backflow of water, the excessive backflow determiner monitoring the duration of time during which backflow of water continuously exists, the excessive backflow determiner providing a second excess backflow signal corresponding to the second backflow threshold when the duration of the continuous back flow of water at least equals the back flow threshold;

the flow monitoring circuit also comprising a controller circuit coupled to the excessive forward flow determiner circuit and to the excessive backflow determiner circuit for receiving the respective first excessive forward flow signal and second excessive backflow signal, the controller being coupled to the valve and being operable to provide the valve close signal in the event water flow at least in the first direction exceeds the first forward flow threshold and in the event water flow in the second direction exceeds the second backflow threshold.

\* \* \* \* \*

UNITED STATES PATENT AND TRADEMARK OFFICE
CERTIFICATE OF CORRECTION

PATENT NO. : 7,299,819 B1  
APPLICATION NO. : 11/451754  
DATED : November 27, 2007  
INVENTOR(S) : John A. Fenton and Donald E. Hulick Page 1 of 1

It is certified that error appears in the above-identified patent and that said Letters Patent is hereby corrected as shown below:

Column 8, lines 23-24, delete "from".

Column 15, line 27, "to contact" should read --to a contact--.

Column 15, lines 59-60, "comprising selectively" should read --comprising a selectively--.

Column 15, line 64, "comprising second" should read --comprising a second--.

Column 20, line 15, "begins" should read --being--.

Column 22, line 62, "in other second direction" should read --in said second direction--.

Column 23, line 60, "in other second direction" should read --in said second direction--.

Signed and Sealed this

Fourteenth Day of July, 2009

JOHN DOLL  
*Acting Director of the United States Patent and Trademark Office*